United States Patent
Howarth et al.

(10) Patent No.: US 8,249,953 B2
(45) Date of Patent: Aug. 21, 2012

(54) METHODS AND APPARATUS FOR DETERMINING THE STATUS OF A DEVICE

(75) Inventors: Arthur G. Howarth, San Jose, CA (US); Rajiv Singhal, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1628 days.

(21) Appl. No.: 10/891,238

(22) Filed: Jul. 13, 2004

(65) Prior Publication Data

US 2006/0033606 A1     Feb. 16, 2006

Related U.S. Application Data

(60) Provisional application No. 60/570,999, filed on May 13, 2004.

(51) Int. Cl.
*G06Q 10/00*     (2006.01)
(52) U.S. Cl. .......... 705/28; 340/9.1; 340/10.1; 370/445; 370/335
(58) Field of Classification Search .................. None
See application file for complete search history.

(56) References Cited

U.S. PATENT DOCUMENTS

| | | | |
|---|---|---|---|
| 4,625,081 A * | 11/1986 | Lotito et al. | 379/88.26 |
| 4,688,026 A | 8/1987 | Schribner et al. | |
| 5,339,073 A | 8/1994 | Dodd et al. | |
| 5,588,009 A * | 12/1996 | Will | 714/749 |
| 5,646,616 A | 7/1997 | Komatsu | |
| 5,850,187 A | 12/1998 | Carrender et al. | |
| 5,887,176 A | 3/1999 | Griffith et al. | |
| 6,070,187 A | 5/2000 | Subramaniam et al. | |
| 6,111,517 A | 8/2000 | Atick et al. | |
| 6,115,079 A | 9/2000 | McRae | |
| 6,212,563 B1 | 4/2001 | Beser | |
| 6,272,113 B1 * | 8/2001 | McIntyre et al. | 370/248 |
| 6,300,903 B1 | 10/2001 | Richards et al. | |
| 6,324,575 B1 | 11/2001 | Jain et al. | |
| 6,330,597 B2 | 12/2001 | Collin et al. | |
| 6,393,458 B1 | 5/2002 | Gigliotti et al. | |

(Continued)

FOREIGN PATENT DOCUMENTS

EP     1355448     10/2003

(Continued)

OTHER PUBLICATIONS

International Search Report dated Feb. 17, 2006, from related International Application No. PCT/US05/15322, 5 pp. including Notification of Transmittal.

(Continued)

*Primary Examiner* — Luna Champagne
(74) *Attorney, Agent, or Firm* — Weaver Austin Villeneuve & Sampson LLP

(57) ABSTRACT

Methods and devices are provided for determining the status of a networked device, e.g., a networked RFID device. In some embodiments of the invention, a customized packet is used to transmit a "heartbeat" from each of a plurality of networked devices to a server. Some such embodiments use a customized syslog packet for the heartbeats. The heartbeat includes identification information regarding the device, e.g., the unique electronic product code ("EPC") of the device. The identification information may include other identification and/or authentication information, such as a shared secret and time data, which may be hashed with the identification information. The heartbeat may include information indicating the health, accuracy and/or reliability of the device and/or of the network that includes the device.

48 Claims, 9 Drawing Sheets

U.S. PATENT DOCUMENTS

| | | | |
|---|---|---|---|
| 6,473,858 B1 * | 10/2002 | Shimomura et al. | 713/150 |
| 6,539,281 B2 | 3/2003 | Wan et al. | |
| 6,553,489 B1 | 4/2003 | Osler et al. | |
| 6,843,121 B1 | 1/2005 | DeBar et al. | |
| 6,912,213 B2 * | 6/2005 | Kim | 370/338 |
| 6,931,574 B1 | 8/2005 | Coupal et al. | |
| 6,963,282 B1 | 11/2005 | Yeates et al. | |
| 7,057,511 B2 | 6/2006 | Shanks et al. | |
| 7,064,660 B2 | 6/2006 | Perkins et al. | |
| 7,075,412 B1 | 7/2006 | Reynolds et al. | |
| 7,081,819 B2 | 7/2006 | Martinez de Velasco Cortina et al. | |
| 7,103,040 B2 | 9/2006 | Aalbers et al. | |
| 7,103,886 B2 | 9/2006 | Haller et al. | |
| 7,117,364 B1 * | 10/2006 | Hepper et al. | 713/176 |
| 7,129,837 B2 | 10/2006 | Shannon et al. | |
| 7,150,017 B1 * | 12/2006 | Vogl et al. | 718/102 |
| 7,165,722 B2 | 1/2007 | Shafer et al. | |
| 7,177,915 B2 | 2/2007 | Kopchik | |
| 7,205,897 B2 | 4/2007 | Lin | |
| 7,213,768 B2 | 5/2007 | Patel et al. | |
| 7,221,660 B1 * | 5/2007 | Simonson et al. | 370/312 |
| 7,260,115 B1 * | 8/2007 | DeFord | 370/475 |
| 7,302,370 B2 * | 11/2007 | Nickerson et al. | 703/6 |
| 7,322,523 B2 | 1/2008 | Howarth et al. | |
| 7,325,734 B2 | 2/2008 | Howarth et al. | |
| 7,333,001 B2 | 2/2008 | Lane et al. | |
| 7,333,479 B2 | 2/2008 | Jalkanen et al. | |
| 7,336,175 B2 | 2/2008 | Howarth et al. | |
| 7,394,381 B2 | 7/2008 | Hanson et al. | |
| 7,422,152 B2 | 9/2008 | Howarth et al. | |
| 7,568,015 B2 | 7/2009 | Wang et al. | |
| 7,593,427 B1 | 9/2009 | Wongsonegoro et al. | |
| 7,648,070 B2 * | 1/2010 | Droms et al. | 235/451 |
| 8,060,623 B2 | 11/2011 | Vogel et al. | |
| 8,113,418 B2 | 2/2012 | Howarth et al. | |
| 2001/0012292 A1 * | 8/2001 | Merrill et al. | 370/389 |
| 2001/0028308 A1 | 10/2001 | De La Huerga | |
| 2002/0001307 A1 | 1/2002 | Nguyen et al. | |
| 2002/0016739 A1 | 2/2002 | Ogasawara | |
| 2002/0046263 A1 | 4/2002 | Camerini et al. | |
| 2002/0075805 A1 | 6/2002 | Gupta et al. | |
| 2002/0161907 A1 | 10/2002 | Moon | |
| 2003/0046339 A1 | 3/2003 | Ip | |
| 2003/0065784 A1 | 4/2003 | Herrod | |
| 2003/0095032 A1 | 5/2003 | Hoshino et al. | |
| 2003/0126248 A1 | 7/2003 | Chambers | |
| 2003/0174714 A1 | 9/2003 | Manik et al. | |
| 2003/0177374 A1 * | 9/2003 | Yung et al. | 713/189 |
| 2003/0226887 A1 | 12/2003 | Komine et al. | |
| 2004/0010594 A1 | 1/2004 | Boyd et al. | |
| 2004/0021569 A1 | 2/2004 | Lepkofker et al. | |
| 2004/0061646 A1 | 4/2004 | Andrews et al. | |
| 2004/0064577 A1 * | 4/2004 | Dahlin et al. | 709/235 |
| 2004/0069852 A1 | 4/2004 | Seppinen et al. | |
| 2004/0073600 A1 | 4/2004 | Elo et al. | |
| 2004/0100383 A1 | 5/2004 | Chen et al. | |
| 2004/0108795 A1 | 6/2004 | Meek et al. | |
| 2004/0128389 A1 | 7/2004 | Kopchik | |
| 2004/0145474 A1 | 7/2004 | Schmidtberg et al. | |
| 2004/0257202 A1 | 12/2004 | Coughlin et al. | |
| 2004/0259557 A1 | 12/2004 | Bey | |
| 2005/0021626 A1 | 1/2005 | Prajapat et al. | |
| 2005/0027778 A1 | 2/2005 | Dimitrelis et al. | |
| 2005/0080881 A1 | 4/2005 | Voorhees et al. | |
| 2005/0093679 A1 | 5/2005 | Zai et al. | |
| 2005/0099270 A1 | 5/2005 | Diorio et al. | |
| 2005/0102406 A1 | 5/2005 | Moon | |
| 2005/0199716 A1 | 9/2005 | Shafer et al. | |
| 2005/0209947 A1 | 9/2005 | Shafer | |
| 2005/0228887 A1 | 10/2005 | Wang et al. | |
| 2005/0252957 A1 | 11/2005 | Howarth et al. | |
| 2005/0252970 A1 | 11/2005 | Howarth et al. | |
| 2005/0252971 A1 | 11/2005 | Howarth et al. | |
| 2005/0253717 A1 | 11/2005 | Howarth et al. | |
| 2005/0253718 A1 | 11/2005 | Droms et al. | |
| 2005/0253722 A1 | 11/2005 | Droms et al. | |
| 2005/0264420 A1 | 12/2005 | Vogel et al. | |
| 2006/0005035 A1 | 1/2006 | Coughlin | |
| 2006/0010086 A1 | 1/2006 | Klein | |
| 2006/0022801 A1 | 2/2006 | Husak et al. | |
| 2006/0031374 A1 | 2/2006 | Lu et al. | |
| 2006/0044111 A1 | 3/2006 | Kollar et al. | |
| 2006/0091999 A1 | 5/2006 | Howarth | |
| 2006/0123467 A1 | 6/2006 | Kumar et al. | |
| 2006/0132304 A1 | 6/2006 | Cabell | |
| 2006/0143318 A1 | 6/2006 | Prajapat et al. | |
| 2006/0146879 A1 | 7/2006 | Anthias et al. | |
| 2006/0253590 A1 | 11/2006 | Nagy et al. | |
| 2006/0259183 A1 | 11/2006 | Hayes et al. | |
| 2006/0266832 A1 | 11/2006 | Howarth et al. | |
| 2006/0280181 A1 | 12/2006 | Brailas et al. | |
| 2007/0013518 A1 | 1/2007 | Howarth | |
| 2007/0027966 A1 | 2/2007 | Singhal et al. | |
| 2007/0080784 A1 | 4/2007 | Kim et al. | |
| 2007/0109100 A1 * | 5/2007 | Jett et al. | 340/10.4 |
| 2007/0112574 A1 | 5/2007 | Greene | |
| 2007/0258048 A1 | 11/2007 | Pitchers | |
| 2007/0283001 A1 | 12/2007 | Spiess et al. | |
| 2008/0087730 A1 | 4/2008 | Howarth et al. | |
| 2008/0104209 A1 | 5/2008 | Singhal et al. | |
| 2008/0136599 A1 | 6/2008 | Sugano et al. | |
| 2008/0197980 A1 | 8/2008 | Howarth et al. | |
| 2009/0049191 A1 | 2/2009 | Tolliver | |
| 2011/0004781 A1 | 1/2011 | Howarth | |

FOREIGN PATENT DOCUMENTS

| | | |
|---|---|---|
| EP | 1376456 | 1/2004 |
| GB | 2365662 | 2/2002 |
| WO | WO98-26530 | 6/1998 |
| WO | WO03-021465 | 3/2003 |
| WO | WO2004-012424 | 2/2004 |
| WO | WO2005-114604 | 5/2005 |
| WO | WO2005-060208 | 6/2005 |
| WO | WO2005-114545 | 12/2005 |
| WO | WO2005-114602 | 12/2005 |
| WO | WO2005-114603 | 12/2005 |

OTHER PUBLICATIONS

Written Opinion of the International Searching Authority dated Feb. 17, 2006, from related International Application No. PCT/US05/15322, 3 pp.

R. Droms, *Dynamic Host Configuration Protocol*, http://www.ietf.org/rfc/, Bucknell University, Mar. 1997 (RFC 2131), printed Mar. 24, 2005, 43 pages.

S. Alexander et al., *DHCP Options and BOOTP Vendor Extensions*, http://www.ietf.org/rfc/, Silicon Graphics, Inc., Mar. 1997 (RFC 2132), printed Mar. 24, 2005, 32 pages.

G. Stump et al., *The User Class Option for DHCP*, http://www.ietf.org/rfc/, IBM, Nov. 2000 (RFC 3004), printed Mar. 24, 2005, 6 pages.

Y. T'Joens, *DHCP Reconfigure Extension*, http://www.ietf.org/rfc/, Alcatel, Dec. 2001, printed Mar. 24, 2005 (RFC 3203), 6 pages.

M. Patrick, *DHCP Relay Agent Information Option*, http://www.ietf.org/rfc/, Motorola BCS, Jan. 2001 (RFC 3046), printed Mar. 24, 2005, 14 pages.

EPCgl, *Frequently Asked Questions*, http://www.epcglobalinc.com/about/faqs.html, printed Mar. 24, 2005, 9 pages.

C. Lonvick, *The BSD Syslog Protocol*, http://www.ietf.org/rfc/, Cisco Systems, Aug. 2001 (RFC 3164), printed Mar. 26, 2005, 28 pages.

Johnston, M., DHCP Preboot Execution Environment (PXE) Options draft-ietf-dhc-pxe-options-01.txt, Internet-Draft, Jan. 21, 2005, 7 pages.

Johnson, R., *TFTP Server Address DHCP Option draft-raj-dhc-tftp-addr-option-00.txt*, Internet-Draft, Feb. 6, 2005, 7 pages.

Littlefield, J., *Vendor-Identifying Vendor Options for Dynamic Host Configuration Protocol version 4 (DPHCPv4)*, RFC 3925, Oct. 2004, 9 pages.

Schulzrinne, H., Dynamic Host Configuration Protocol (DHCPv4 and DHCPv6) Option for Civic Addresses Configuration Information, draft-ietf-geopriv-dhcp-civil-05, Internet-Draft, Feb. 19, 2004.

Polk, J., et al., Dynamic Host Configuration Protocol Option for Coordinate-based Location Configuration Information, RFC 3825, Jul. 2004, 15 pages.

AeroScout Visibility System: Bridging the Gap Between Wi-Fi, Active RFID and Telemetry, AeroScout Enterprise Visibility Solutions, http://www.aeroscout.com/content.asp?page=SystemOverview, printed Apr. 16, 2005, 3 pages.

WhereNet, Products, http://wherenet.com/products_main.html, printed Apr. 16, 2005, 2 pages.

Simple Network Management Protocol, Internetworking Technologies Handbook, Chapter-56, printed Jul. 14, 2005, 12 pages.

Harrington, D., et al, An Architecture for DescribingSimple Network Management Protocol (SNMP) Management Frameworks, RFC 3411, Dec. 2002, 64 pages.

Presuhn, R., Editor, Version 2 of the Protocol Operations for the Simple Network Management Protocol (SNMP), RFC 3416, Dec. 2002, 31 pages.

EPCglobal Tag Data Standards Version 1.1 Rev.1.24, EPCglobal, Standard Specification, Apr. 1, 2004, 78 pages.

Global Location No. (GLN) Implementation Guide, Uniform Code Council, Inc., May 2002, 13 pages.

The Global Language of Business, retrieved from the internet: http://www.ean-int.org/locations.html, [retrieved Mar. 24, 2005], 5 pages.

"*Cisco Application-Oriented Networking: A Network-Based Intelligent Message Routing System*", http://www.cisco.com/en/US/products/ps6438/products_data_sheet0900aecd802c1f9c.html Data Sheet, Cisco Systems, Inc., Jul. 13, 2005, pp. 1-7.

"*Cisco Catalyst 6500 Series Application-Oriented Networking Module*", http://www.cisco.com/en/US/products/ps6438/products_data_sheet0900aecd802c1fe9.html Data Sheet, Cisco Systems, Inc. Jul. 13, 2005, pp. 1-3.

"*Cisco Application-Oriented Networking—A Network Embedded Intelligent Message Routing System*", http://www.cisco.com/en/US/products/ps6438/prod_bulletin0900aecd802c201b.html Product Bulletin No. 2886, Cisco Systems, Inc. Jul. 13, 2005, pp. 1-3.

"*Cisco Catalyst 6500 Series Application-Oriented Networking Module: Large Photo*", Photo, Retrieved from the internet: http://www.cisco.com/en/US/products/ps6448/prod_view_selector.html [Retrieved Jul. 13, 2005], Cisco Systems, Inc. 1 page.

"*The EPCglobal Architecture Framework*" EPCglobal Final Version of Jul. 1, 2005, pp. 1-53.

Girardot, Marc and Sundaresan, Neel, "*Millau: an encoding format for efficient representation and exchange of XML over the web*" [Retrieved Jan. 31, 2005]. Retrieved from the internet: http:www9.org/w9cdrom/154/154.html 25 pages.

Fujitsu Limited, et al., "*Web Services Reliability (WS-Reliability) Ver1.0*", Jan. 8, 2003. pp. 1-45.

Biloruset, Ruslan et al., "*Web Services Reliable Messaging Protocol (WS-ReliableMessaging)*", Mar. 2004, pp. 1-40.

Mockapetris, P., "*Domain Names—Concepts and Facilities*", RFC 1034, Nov. 1987, 43 pages.

Mockapetris, P., "*Domain Names—Implementation and Specification*", RFC 1035, 55 pages.

International Search Report dated Jul. 13, 2006, from (related) International Application No. PCT/US05/16319, 5 pp. including Notification of Transmittal.

Written Opinion of the International Searching Authority dated Jul. 13, 2006, from (related) International Application No. PCT/US05/16319, 5 pp.

US Office Action mailed Oct. 6, 2006 from (related) U.S. Appl. No. 10/866,506.

US Office Action mailed Oct. 6, 2006 from (related) U.S. Appl. No. 10/866,285.

US Office Action mailed Nov. 13, 2006 from (related)U.S. Appl. No. 11/073,245, 12 pp.

US Office Action mailed Jan. 18, 2007 from (related) U.S. Appl. No. 10/866,507, 4 pp.

US Office Action mailed Mar. 22, 2007 from (related) U.S. Appl. No. 10/866,506.

US Office Action mailed Apr. 4, 2007 from (related) U.S. Appl. No. 10/866,285.

US Office Action mailed Jun. 18, 2007 from (related) U.S. Appl. No. 11/010,089.

U.S. Office Action mailed Jun. 26, 2007 from U.S. Appl. No. 11/195,160.

Notice of Allowance and Notice of Allowability, mailed Sep. 10, 2007 from U.S. Appl. No. 10/866,506.

Notice of Allowance and Notice of Allowability, mailed Sep. 28, 2007 from U.S. Appl. No. 10/866,507.

Notice of Allowance and Notice of Allowability, mailed Sep. 10, 2007 from U.S. Appl. No. 10/866,285.

Notice of Allowance and Notice of Allowability, mailed Oct. 11, 2007 from U.S. Appl. No. 11/010,089.

Notice of Allowance and Notice of Allowability, mailed Sep. 19, 2007 from U.S. Appl. No. 11/195,160.

US Notice of Allowance dated Jun. 1, 2009 issued in U.S. Appl. No. 11/954,721.

US Notice of Allowance dated Feb. 11, 2009 issued in U.S. Appl. No. 11/954,721.

US Office Action dated Aug. 13, 2008 issued in U.S. Appl. No. 11/954,721.

US Office Action dated Mar. 31, 2009 issued in U.S. Appl. No. 11/304,944.

US Final Office Action dated Oct. 30, 2009 issued in U.S. Appl. No. 11/304,944.

US Notice of Allowance dated Jan. 11, 2008 issued in U.S. Appl. No. 11/010,089.

US Office Action dated Aug. 4, 2009 issued in U.S. Appl. No. 11/496,779.

US Office Action dated May 12, 2008 issued in U.S. Appl. No. 11/104,140.

US Office Action Final dated Oct. 6, 2008 issued in U.S. Appl. No. 11/104,140.

US Examiner Interview Summary dated Jan. 14, 2009 issued in U.S. Appl. No. 11/104,140.

US Office Action dated Mar. 4, 2009 issued in U.S. Appl. No. 11/104,140.

US Office Action (Restriction) dated Apr. 1, 2008 issued in U.S. Appl. No. 11/119,169.

US Office Action dated Aug. 6, 2008 issued in U.S. Appl. No. 11/119,169.

US Notice of Allowance and Examiner's Amendment dated Feb. 11, 2009 issued in U.S. Appl. No. 11/119,169.

US Notice of Allowance dated Jun. 4, 2009 issued in U.S. Appl. No. 11/119,169.

US Notice of Allowance dated Aug. 31, 2009 issued in U.S. Appl. No. 11/129,709.

US Notice of Allowance dated Apr. 13, 2009 issued in U.S. Appl. No. 11/129,709.

US Notice of Allowance dated Nov. 10, 2008 issued in U.S. Appl. No. 11/129,709.

US Notice of Allowance dated Aug. 8, 2008 issued in U.S. Appl. No. 11/129,709.

US Notice of Allowance dated Mar. 26, 2008 issued in U.S. Appl. No. 11/129,709.

US Office Action dated Nov. 26, 2008 issued in U.S. Appl. No. 11/182,312.

US Examiner's Amendment dated Nov. 7, 2007 issued in U.S. Appl. No. 11/195,160.

US Examiner's Amendment and Supplemental Notice of Allowance dated Oct. 22, 2007 issued in U.S. Appl. No. 11/195,160.

Canadian Examination Report dated Nov. 17, 2008 issued in CA2565099.

Canadian Examination Report dated Feb. 4, 2008 issued in CA2565099.

Chinese Office Action (first) dated Feb. 29, 2008 issued in CN1954327 [CN200580015167.4].

Chinese Office Action (second) dated Aug. 15, 2008 issued in CN1954327 [CN200580015167.4].

Chinese Office Action (third) dated Feb. 20, 2009 issued in CN1954327 [CN200580015167.4].

Canadian Examination Report dated Feb. 1, 2008 issued in CA 2,565,456.

Chinese Office Action (first) dated Feb. 29, 2008 issued in CN1954329 [CN200580015169.3].

Chinese Office Action (second) dated Aug. 15, 2008 issued in CN1954329 [CN200580015169.3].

Chinese Office Action (first) dated Feb. 29, 2008 issued in CN200580015168.9.
Chinese Office Action (second) dated Aug. 15, 2008 issued in CN200580015168.9.
PCT International Preliminary Examination Report dated Nov. 14, 2006 issued in WO2005114545 [PCT/US2005/016484].
PCT International Search Report dated Nov. 8, 2005 issued in WO2005-114545 [PCT/US2005/016484].
PCT Written Opinion dated Nov. 8, 2005 issued in WO2005114545 [PCT/US2005/016484].
PCT International Preliminary Examination Report dated Nov. 14, 2006 issued in WO2005-114602 [PCT/US2005/015322].
PCT International Search Report dated May 19, 2008 issued in WO2006107613 [PCT/US2007/16321].
PCT International Preliminary Examination Report dated Feb. 3, 2009 issued in WO2006107613 [PCT/US2007/16321].
PCT Written Opinion dated May 19, 2008 issued in WO2006107613 [PCT/US2007/16321].
PCT International Preliminary Examination Report dated Nov. 14, 2006 issued in WO2005-114603 [PCT/US2005/016319].
PCT International Search Report dated Jul. 13, 2006 issued in WO2005-114603 [PCT/US2005/016319].
PCT Written Opinion dated Jul. 13, 2006 issued in WO2005-114603 [PCT/US2005/016319].
PCT International Preliminary Examination Report dated Oct. 3, 2007 issued in WO2005114604 [PCT/US2005/016958].
PCT International Search Report dated Mar. 6, 2008 issued in WO2007011591 [PCT/US2006/026970].
PCT Written Opinion dated Mar. 6, 2008 issued in WO2007011591 [PCT/US2006/026970].
PCT International Preliminary Examination Report dated Mar. 17, 2009 issued in WO2007011591 [PCT/US2006/026970].
US Notice of Allowance dated Sep. 22, 2009 issued in U.S. Appl. No. 11/954,721.
US Office Action dated Apr. 14, 2010 issued in U.S. Appl. No. 11/304,944.
US Office Action Final dated Jan. 26, 2010 issued in U.S. Appl. No. 11/496,779.
US Final Office Action dated Sep. 30, 2009 issued in U.S. Appl. No. 11/104,140.
US Notice of Allowance dated Dec. 15, 2009 issued in U.S. Appl. No. 11/119,169.
US Notice of Allowance dated Apr. 19, 2010 issued in U.S. Appl. No. 11/119,169.
US Office Action dated Jun. 10, 2009 issued in U.S. Appl. No. 11/182,312.
US Office Action dated Apr. 28, 2010 issued in U.S. Appl. No. 11/965,693.
US Office Final Action dated Nov. 2, 2009 issued in U.S. Appl. No. 11/965,693.
US Office Action dated Oct. 2, 2009 issued in U.S. Appl. No. 11/346,739.
US Office Action Final dated Apr. 14, 2010 issued in U.S. Appl. No. 11/346,739.
PCT International Preliminary Report on Patentability dated Nov. 23, 2006 issued in WO2005114545. [PCT/US2005/016484].
PCT International Preliminary Report on Patentability dated Nov. 23, 2006 issued in WO2005114602. [PCT/US2005/015322].
US Office Action dated Aug. 23, 2010 issued in U.S. Appl. No. 11/104,140.
US Office Notice of Allowance dated Sep. 1, 2010 issued in U.S. Appl. No. 11/182,312.
US Office Notice of Allowance dated May 11, 2010 issued in U.S. Appl. No. 11/182,312.
Australian Examination Report dated Apr. 17, 2009 issued in AU 2005246794.
Chinese Office Action dated Oct. 23, 2009 issued in CN200580015166.X.
European Supplementary Search Report dated Aug. 9, 2010 issued in EP05750091.1.
European Supplementary Search Report dated Aug. 6, 2010 issued in EP05743006.8.
European Supplementary Search Report dated Aug. 6, 2010 issued in EP05747434.8.
Abbott, N (2003) "Alternatives for Providing Routing and Location Information to Support Emergency Calling from IP Enterprises," NENA Technical Information Document; Oct. 3, 2003, XP002323684, pp. 1-16.
Droms, Bucknell University R: "Dynamic Host Configuration Protocol," rfc 2131.txt, IETF Standard, Internet Engineering Task Force, IETF, CH, Mar. 1, 1997, XP015007915, ISSN: 0000-0003, pp. 20-21, 33, and 39.
EPCglobal, EPC Generation 1 Tag Data Standards Version 1.1 Rev. 1.27; http://www.epcglobalinc.org/standards/tds/tds_1_1rev_1_27-standard-20050510.pdf; May 10, 2005, 87 pgs (submitted in 3 parts).
Patrick, Motorola BCS M: DHCP Relay Agent Information Option; rfc3046.txt; IETF Standard, Internet Engineering Task Force, IETF, Ch, Jan. 1, 2001, XP015008829; ISSN 0000-0003, pp. 5-8.
RFC-2236 Internet Group Management Protocol, v.1, Nov. 1997, retrieved from the Internet on Oct. 22, 2007 and Aug. 5, 2010 at http://www.faqs.org/rfcs/rfc2236.html, 19pgs.
US Office Action dated Feb. 7, 2011, from U.S. Appl. No. 11/304,944.
US Final Office Action dated Jul. 20, 2011, from U.S. Appl. No. 11/304,944.
US Office Action dated Jun. 18, 2007, from U.S. Appl. No. 11/010,089.
US Non-Final Office Action dated Apr. 4, 2011, from U.S. Appl. No. 12/082,635.
US Non-Final Office Action dated May 12, 2011, from U.S. Appl. No. 11/496,779.
Canadian Office Action dated Jul. 5, 2011, from CA Appl. No. 2,565,451.
US Non-Final Office Action dated Sep. 29, 2011, from U.S. Appl. No. 12/082,635.
US Notice of Allowance dated Oct. 11, 2011, from U.S. Appl. No. 11/496,779.
US Notice of Allowance dated Aug. 11, 2011 from U.S. Appl. No. 11/104,140.
Canadian Examination Report dated Oct. 14, 2010, from CA Appl. No. 2565099.
EP Office Action dated Oct. 8, 2010, in Appl. No. EP05750091.0.
EP Office Action dated Oct. 18, 2010, in Appl. No. EP05743006.8.
EP Office Action dated Oct. 26, 2010, in Appl. No. EP05747434.8.
EP Supplementary European Search Report dated Aug. 6, 2010, in Appl. No. EP05753531.2.
EP Office Action dated Oct. 8, 2010, in Appl. No. EP05753531.2.
US Office Action dated Oct. 28, 2010, from U.S. Appl. No. 11/304,944.
US Non-Final Office Action dated Oct. 26, 2010, from U.S. Appl. No. 12/082,635.
US Non-Final Office Action dated Nov. 22, 2010, from U.S. Appl. No. 11/496,779.
US Office Notice of Allowance dated May 11, 2010, from U.S. Appl. No. 11/182,312.
US Office Action dated Nov. 16, 2010, from U.S. Appl. No. 11/965,693.

* cited by examiner

METHODS AND APPARATUS FOR DETERMINING THE STATUS OF A DEVICE

CROSS REFERENCE TO RELATED APPLICATION

This application claims priority to the U.S. Provisional Application No. 60/570,999, entitled "Methods and Devices for Uniquely Provisioning RFID Devices" and filed on May 13, 2004. This application is related to the following U.S. patent applications, all of which are hereby incorporated by reference for all purposes: U.S. patent application Ser. No. 10/866,506, entitled "Methods and Devices for Uniquely Provisioning RFID Devices" and filed on Jun. 9, 2004; U.S. patent application Ser. No. 10/866,507, entitled "Methods and Devices for Locating and Uniquely Provisioning RFID Devices" and filed on Jun. 9, 2004; and U.S. patent application Ser. No. 10/866,285, entitled "Methods and Devices for Assigning RFID Device Personality" and filed on Jun. 9, 2004.

BACKGROUND OF THE INVENTION

1. Field of the Invention

The present invention relates methods and devices for monitoring the status of networked devices. More particularly, the present invention relates to monitoring the status of relatively unsophisticated devices, such as radio frequency identification ("RFID") devices, in a network.

2. Description of the Related Art

"Smart labels," generally implemented by RFID tags, have been developed in an effort to address the shortcomings of bar codes and add greater functionality. RFID tags have been used to keep track of items such as airline baggage, items of clothing in a retail environment, cows and highway tolls. As shown in FIG. 1, an RFID tag 100 includes microprocessor 105 and antenna 110. In this example, RFID tag 100 is powered by a magnetic field 145 generated by an RFID reader 125. The tag's antenna 110 picks up the magnetic signal 145. RFID tag 100 modulates the signal 145 according to information coded in the tag and transmits the modulated signal 155 to the RFID reader 125.

RFID tags use the Electronic Product Code ("EPC" or "ePC") format for encoding information. An EPC code includes variable length bits of information (common formats are 64, 96 and 128 bits), which allows for identification of individual products as well as associated information. As shown in FIG. 1, EPC 120 includes header 130, EPC Manager field 140, Object class field 150 and serial number field 160. EPC Manager field 140 contains manufacturer information. Object class field 150 includes a product's stock-keeping unit ("SKU") number. Serial number field 160 is a 40-bit field that can uniquely identify the specific instance of an individual product i.e., not just a make or model, but also down to a specific "serial number" of a make and model.

In theory, RFID tags and associated RFID devices (such as RFID readers and printers) could form part of a network for tracking a product (or a group of products) and its history. However, various difficulties have prevented this theory from being realized. One problem that has required considerable time and energy from RF engineers is the development of lower-cost RFID tags with acceptable performance levels.

In part because of the significant efforts that have been expended in solving the foregoing problems, prior art systems and methods for networking RFID devices are rather primitive. RFID devices have only recently been deployed with network interfaces. Prior art RFID devices and systems are not suitable for large-scale deployment of networks of RFID devices.

Conventional RFID devices also have a small amount of available memory. A typical RFID device may have approximately 0.5 Mb of flash memory and a total of 1 Mb of overall memory. The small memories of RFID devices place restrictions on the range of possible solutions to the problems noted herein. In addition, an RFID device typically uses a proprietary operating system, e.g., of the manufacturer of the microprocessor(s) used in the RFID device.

RFID devices do not currently achieve reliability levels required of customers. Moreover, many RFID devices are deployed in a hostile industrial environment (such as a warehouse or factory) by relatively unskilled "IT" personnel. RFID devices may be used intermittently or infrequently. However, when an RFID device is needed it must perform immediately or significant delays may ensue. These delays may affect an entire supply chain and could result in significant costs.

One established method of determining the status of networked devices is actively polling each device. In part because of the bandwidth consumed by the polling process, this is not a desirable method for networks involving large numbers of devices.

Therefore, it would be desirable to provide methods for ensuring that specific RFID devices, or similarly unsophisticated devices in a network, are healthy and operational. Moreover, it would be desirable to implement such methods without having to actively "poll" such devices.

SUMMARY OF THE INVENTION

Methods and devices are provided for determining the status of a networked device, e.g., a networked RFID device. In some embodiments of the invention, a customized packet is used to transmit a "heartbeat" from each of a plurality of networked devices to a server. Some such embodiments use a customized syslog packet for the heartbeats. The heartbeat includes identification information regarding the device, e.g., the unique electronic product code ("EPC") of the device. The identification information may include other identification and/or authentication information, such as a shared secret and time data, which may be hashed with the identification information. The heartbeat may include information indicating the health, accuracy and/or reliability of the device and/or of the network that includes the device.

Some aspects of the invention provide a method for determining the status of a device. The method includes the following steps: instructing a first radio frequency identification ("RFID") device to transmit a first packet at a first time, the first packet comprising a first Electronic Product Code ("EPC") of the first RFID device and a first time stamp; and determining whether the first RFID device transmitted the first packet.

The first packet may be a syslog packet and may include encrypted authentication information. If so, the method can involve validating the first packet according to the authentication information. The first packet may also include information regarding the utilization of the first RFID device, Internet Protocol packet statistics, information specific to the first RFID device (e.g., information regarding a radio frequency interface of the first RFID device), information specified by a vendor of the first RFID device and/or information regarding a local area network that includes the first RFID device.

The method may also include these steps: instructing the first RFID device to transmit a second packet at a second time, the second packet comprising the first EPC and a second time stamp; and determining whether the first RFID device transmitted the second packet. The method could include the step of instructing the first RFID device to transmit a third packet at a third time, the third packet comprising the first EPC and a third time stamp, wherein a first time interval between the first time and the second time is different from a second time interval between the second time and the third time.

The method can include these steps: instructing a second RFID device to transmit a second packet at a second time, the second packet comprising an EPC of the second RFID device and a second time stamp; and determining whether the second RFID device transmitted the second packet. The second time may be different from the first time.

The second packet may include second information, in addition to the second time stamp, that is different from first information in the first packet.

Alternative aspects of the invention provide a method of determining the status of a plurality of RFID devices. The method includes the following steps: instructing a first RFID device to transmit a first syslog packet at a first time, the first syslog packet comprising a first EPC of the first RFID device and a first time stamp; instructing each of RFID devices 2 through N to transmit second through Nth syslog packets at second through Nth times, respectively, the second syslog packet comprising a second EPC of the second RFID device and a second time stamp and the Nth syslog packet comprising an Nth EPC of the Nth RFID device and an Nth time stamp.

Other aspects of the invention provide a method of determining the status of RFID devices. The method involves providing a first RFID device with first instructions to transmit first syslog packets, each of the first syslog packets comprising a first Electronic Product Code ("EPC") of the first RFID device and each of the first syslog packets being transmitted according to a first time designation. The first time designation may include transmitting one of the first syslog packets, waiting for a first time interval to elapse, then transmitting another of the first syslog packets.

The method may also include providing the first RFID device with second instructions to transmit the first syslog packets, each of the first syslog packets comprising a first EPC of the first RFID device and each of the first syslog packets being transmitted according to a second time designation. The method could include providing the first RFID device with second instructions to transmit second syslog packets, each of the second syslog packets comprising a first EPC of the first RFID device and information not included in the first syslog packets.

Some embodiments of the invention include a computer program embodied in a machine-readable medium. The computer program contains instructions for controlling networked devices to perform the following steps: instructing a first radio frequency identification ("RFID") device to transmit a first packet at a first time, the first packet comprising a first Electronic Product Code ("EPC") of the first RFID device and a first time stamp; and determining whether the first RFID device transmitted the first packet.

The first packet may be a syslog packet and may include encrypted authentication information. The computer program may include instructions for validating the first packet according to the authentication information. The first packet may contain information regarding the utilization of the first RFID device, information regarding a local area network that includes the first RFID device, information regarding Internet Protocol packet statistics, information specific to the first RFID device (e.g., information regarding a radio frequency interface of the first RFID device) and/or information specified by a vendor of the first RFID device.

The computer program may also include instructions for controlling the networked devices to perform the following steps: instructing the first RFID device to transmit a second packet at a second time, the second packet comprising the first EPC and a second time stamp; and determining whether the first RFID device transmitted the second packet.

The computer program may also include commands for the following: instructing a second RFID device to transmit a second packet at a second time, the second packet comprising an EPC of the second RFID device and a second time stamp; and determining whether the second RFID device transmitted the second packet.

The second packet may include second information, in addition to the second time stamp, that is different from first information in the first packet.

The computer program may include instructions for causing the first RFID device to transmit a third packet at a third time, the third packet comprising the first EPC and a third time stamp, wherein a first time interval between the first time and the second time is different from a second time interval between the second time and the third time.

Alternative implementations of the invention include a method for implementing an RFID network The method includes these steps: positioning a networked RFID reader at an exit door of a retail store; enabling the RFID reader to read RFID tags passing through the exit door and to transmit RFID tag information to an RFID network; instructing the RFID reader to transmit a first syslog packet at a first time, the first packet comprising a first EPC of the RFID reader, a first time stamp and a secret; and determining that the RFID reader transmitted the first syslog packet, thereby determining that the RFID reader is operational.

The RFID tag information can include product information and/or shopper information. The method may also include the step of using the RFID tag information to automatically update a database maintained by the retail store and/or a database maintained by a manufacturer of at least one of the products. The method can include the step of using the RFID tag information to cause a financial account to be debited for a cost of the products.

The method can include the step of using the RFID tag information to update a business plan. The business plan may be a marketing plan, a manufacturing plan, a distribution plan and/or a sales plan.

DETAILED DESCRIPTION OF THE INVENTION

Figure 1:
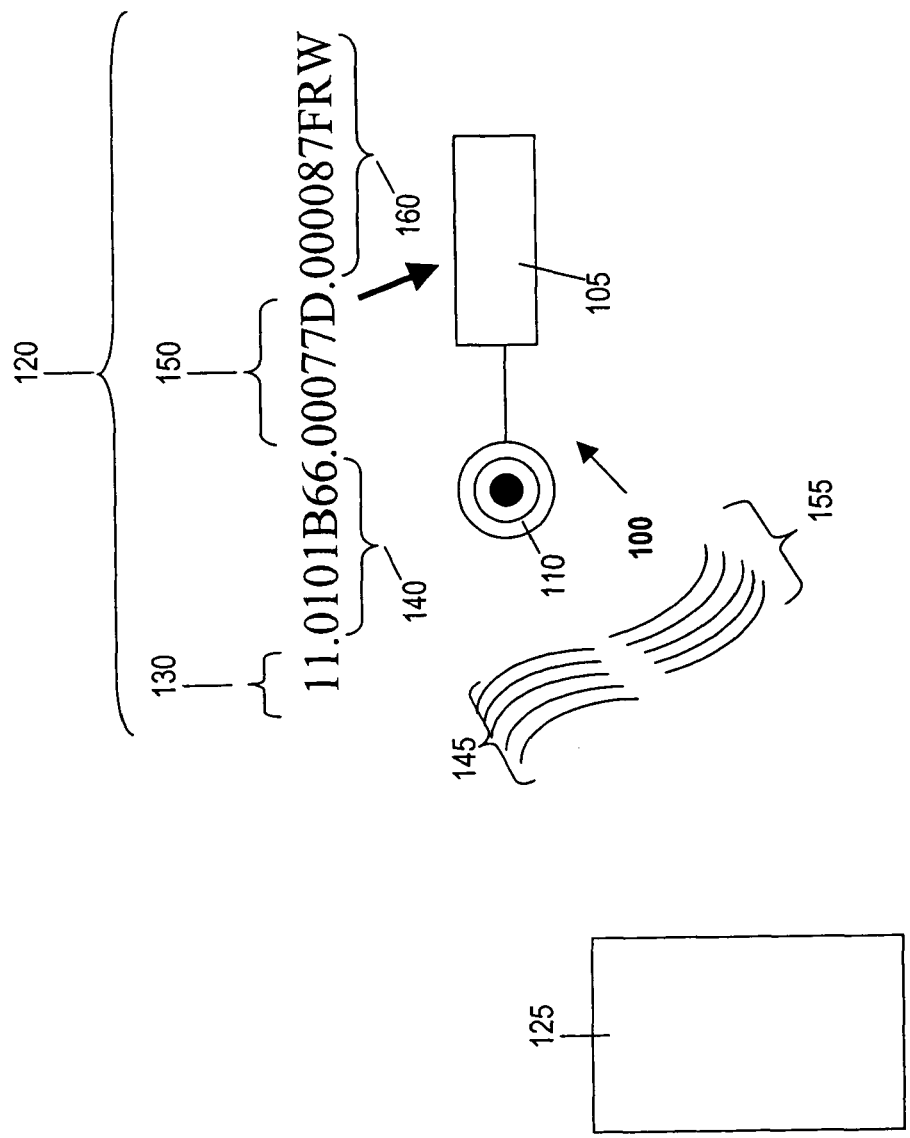
FIG. 1 is a diagram illustrating an RFID tag.

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

The present invention involves methods and apparatus for determining the status of devices in a network. Most of the discussion will involve networked RFID devices. However, those of skill in the art will realize that many aspects of the present invention can be applied to determining the status of other types of devices in a network, particularly devices that are relatively unsophisticated. For example, the methods and devices of the present invention are suitable for networked industrial devices and to sensor networks. Similarly, although much of the discussion herein applies to implementations using customized packets that are generally within the syslog protocol as described in RFC 3164 (hereby incorporated by reference in its entirety), the present invention is not protocol-specific.

Without modification, the syslog protocol is not suitable for implementing the present invention. One basic problem is described in Section 6.2 of RFC 3164:

The syslog delivery mechanism does not strongly associate the message with the message sender. The receiver of that packet will not be able to ascertain that the message was indeed sent from the reported sender, or if the packet was sent from another device.

Section 6.2.2, entitled "Message Forgery," warns that this aspect of syslog has been exploited by attackers:

Malicious exploits of this behavior have also been noted. An attacker may transmit syslog messages (either from the machine from which the messages are purportedly sent or from any other machine) to a collector. In one case, an attacker may hide the true nature of an attack amidst many other messages. As an example, an attacker may start generating forged messages indicating a problem on some machine. This may get the attention of the system administrators who will spend their time investigating the alleged problem. During this time, the attacker may be able to compromise a different machine, or a different process on the same machine. Additionally, an attacker may generate false syslog messages to give untrue indications of status or of events. As an example, an attacker may stop a critical process on a machine, which may generate a notification of exit. The attacker may subsequently generate a forged notification that the process had been restarted. The system administrators may accept that misinformation and not verify that the process had indeed been restarted.

Moreover, Section 6.6, "Message Observation," contains the following admonitions:

Neither the syslog protocol nor the syslog application have mechanisms to provide confidentiality of the messages in transit. In most cases passing clear-text messages is a benefit to the operations staff if they are sniffing the packets off of the wire. The operations staff may be able to read the messages and associate them with other events seen from other packets crossing the wire to track down and correct problems. Unfortunately, an attacker may also be able to observe the human-readable contents of syslog messages. The attacker may then use the knowledge gained from those messages to compromise a machine or do other damage.

Nonetheless, in some embodiments of the invention, a customized packet generally within the syslog protocol is used to transmit a "heartbeat" from each of a plurality of networked devices to a syslog server. In order to overcome the problems noted above, the heartbeat includes identification information regarding the device, e.g., the unique electronic product code ("EPC") of the device. The packet preferably includes other identification and/or authentication information, such as a shared secret and time data, which may be hashed with the identification information. The heartbeat may include information indicating the health, accuracy and/or reliability of the device and/or of the network that includes the device.

The methods and devices of the present invention have very broad utility, both in the public and private sectors. Any enterprise needs to keep track of how its equipment is being deployed, whether that equipment is used for commercial purposes, for military purposes, etc. RFID devices, sensors, etc., that are networked according to the present invention can provide necessary information for allowing enterprises to track equipment and products (or groups of products). The information that will be provided by devices that are networked according to the present invention will be of great benefit for enterprise resource planning, including the planning of manufacturing, distribution, sales and marketing.

For example, using the devices and methods of the present invention, RFID tags and associated RFID devices (such as RFID readers and printers) can form part of a network for tracking a product and its history. Instead of waiting in a checkout line to purchase selected products, a shopper who wishes to purchase products bearing RFID tags can, for example, transport the products through a door that has an RFID reader nearby. The EPC information regarding the products can be provided to an RFID network by the reader and can be used to automatically update a store inventory, cause a financial account to be debited, update manufacturers', distributors' and retailers' product sales databases, etc.

Read/write RFID tags can capture information regarding the history of products or groups of products, e.g., temperature and other environmental changes, stresses, accelerations and/or vibrations that have acted upon the product. It will be particularly useful to record such information for products that relatively more subject to spoilage or other damage, such as perishable foods and fragile items. By using the methods of the present invention, this information will be used to update databases maintained by various entities (e.g., manufacturers, wholesalers, retailers, transportation companies and financial institutions). The information will be used not only to resolve disputes (for example, regarding responsibility for product damage) but also to increase customer satisfaction, to avoid health risks, etc.

Figure 2:
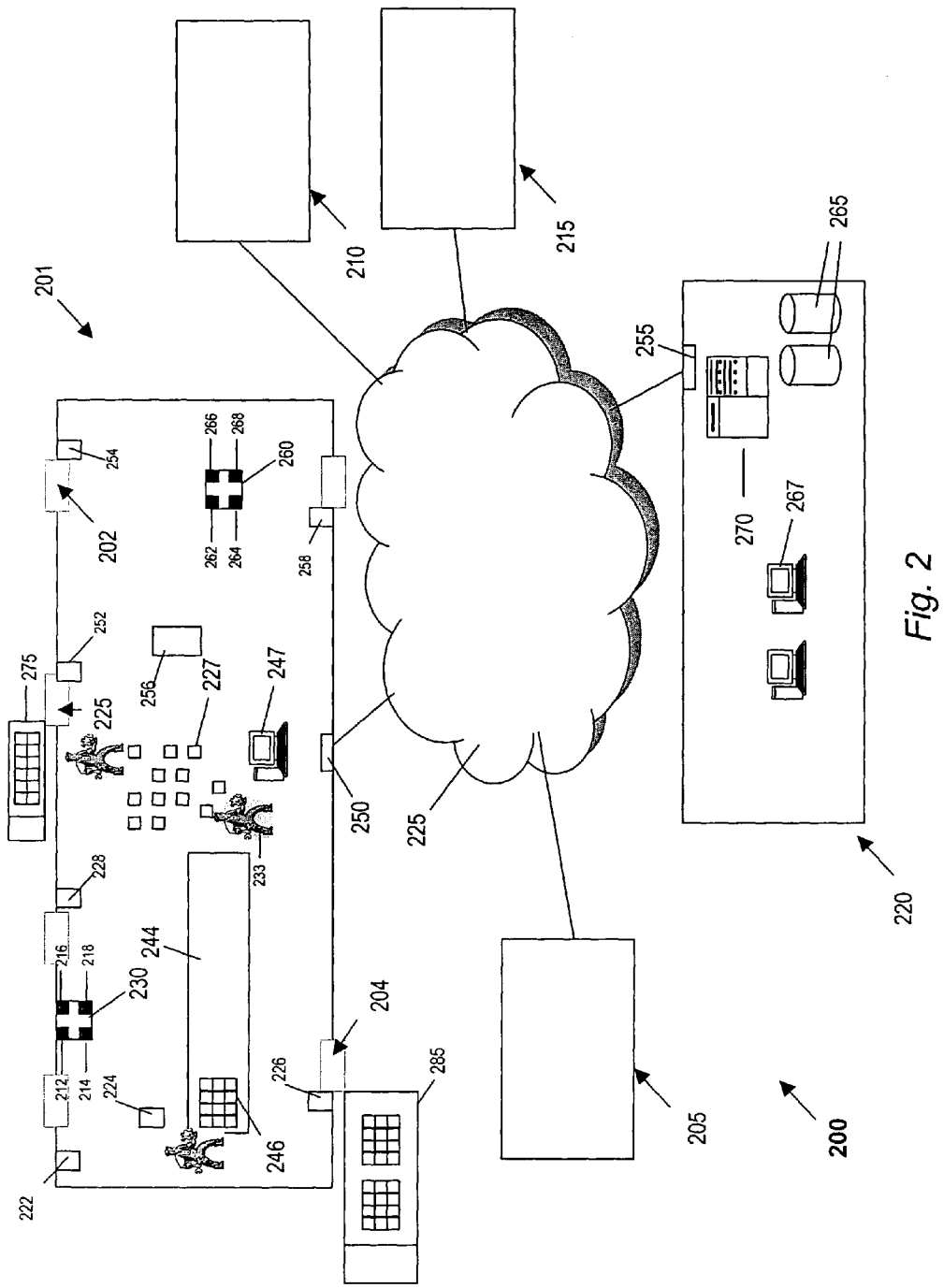
FIG. 2 illustrates an exemplary RFID network according to the present invention.

Some aspects of the invention use a combination of EPC code information and modified versions of existing networking standards for determining the status of devices, such as RFID readers and RFID printers, that are located in a network. An example of such a network is depicted in FIG. 2. Here, RFID network 200 includes warehouse 201, factory 205, retail outlet 210, financial institution 215 and headquarters 220. As will be appreciated by those of skill in the art, network 200 could include many other elements and/or multiple instances of the elements shown in FIG. 2. For example, network 200 could include a plurality of warehouses, factories, etc., and may include a very large number of RFID devices.

In this illustration, products 227 are being delivered to warehouse 201 by truck 275. Products 227, which already include RFID tags, are delivered through door 225. In this example, RFID reader 252 is connected to port 262 of switch 260. Here, switches 230 and 260 are connected to the rest of RFID network 200 via gateway 250 and network 225. Network 225 could be any convenient network, but in this example network 225 is the Internet. RFID reader 252 reads each product that passes through door 225 and transmits the EPC code corresponding to each product on RFID network 200.

RFID tags may be used for different levels of a product distribution system. For example, there may be an RFID tag for a pallet of cases, an RFID tag for each case in the pallet and an RFID tag for each product. Accordingly, after products 227 enter warehouse 201, they are assembled into cases 246. RFID printer 256 makes an RFID tag for each of cases 246. In this example, RFID printer 256 is connected to port 266 of switch 260. RFID printer 256 could operate under the control of PC 247 in warehouse 201, one of PCs 267 in headquarters 220, or some other device.

RFID reader 224, which is connected to port 214, reads the EPC code of each case 246 and product 227 on conveyor belt 244 and transmits this information on network 200. Similarly, RFID reader 226, which is connected to port 216, reads the EPC code of each case 246 and product 227 that exits door 204 and transmits this information on network 200. Cases 246 are loaded onto truck 285 for distribution to another part of the product chain, e.g., to retail outlet 210.

Each of the RFID devices in network 200 preferably has a "personality" of enabled functions that are suitable for its intended use. For example, device 252 could cause a reassuring tone to sound and/or a green light to flash if an authorized person or object enters door 225. However, device 252 might cause an alarm to sound and/or an alert to be sent to an administrator on network 200 if a product exits door 225 or an unauthorized person enters or exits door 225.

The functionality of the RFID devices in a network such as network 200 may be critical to the success of an enterprise. This is no less true in view of the fact that RFID devices may not be in use at all times. If one of the RFID devices described above were not operational during a time of expected use, a delay could ensue that would affect the processing and delivery of many products. For example, if RFID reader 252 were not functioning when products 227 were being delivered to warehouse 201 by truck 275, the delivery of products 227 through door 225 may be delayed. This delay would cause a delay in the processing of products 227, leading to a corresponding delay in the distribution of cases 246 to another part of the product chain. This delay could result in losses of revenue for several enterprises, including wholesalers, distributors and retailers.

Figure 3:
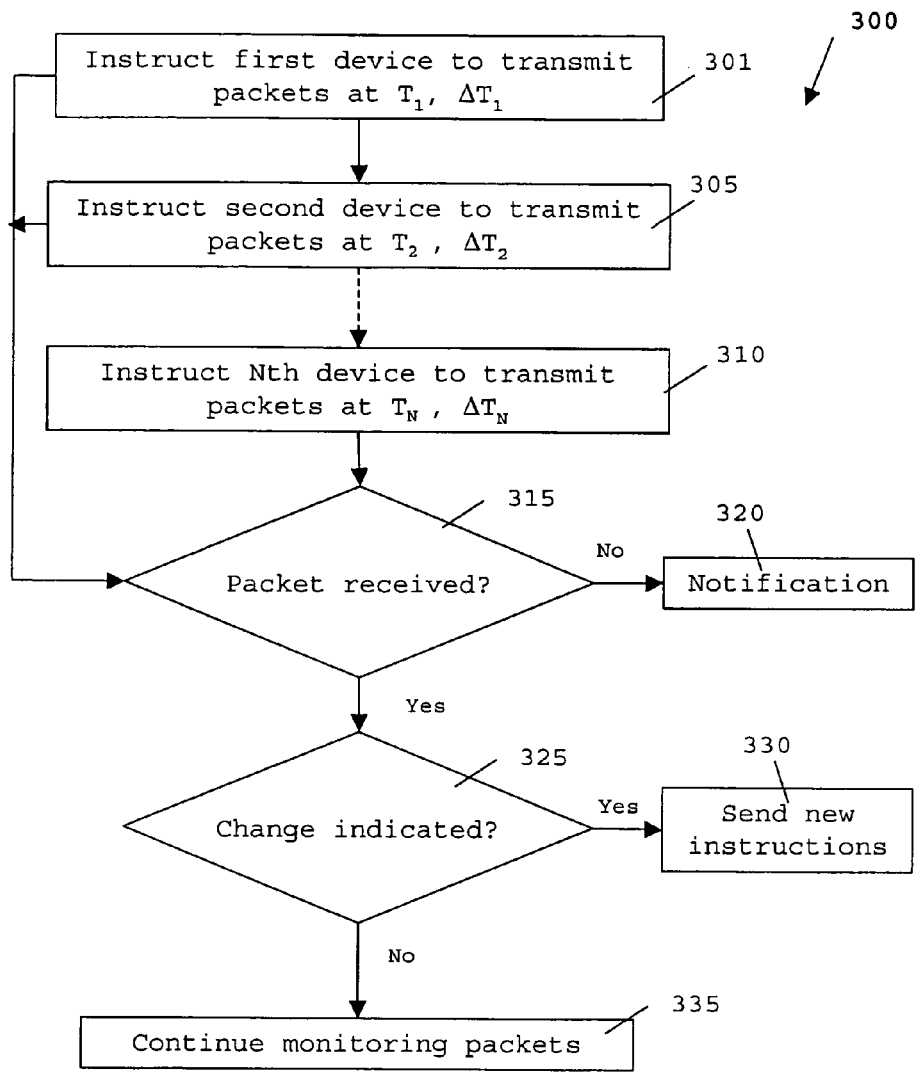
FIG. 3 is a flow chart that outlines a method according to the present invention.

FIG. 3 is a flow chart that outlines method 300 according to some implementations of the present invention. In step 301, a first device is instructed to transmit a first packet at a first time. The packet will sometimes be referred to herein as a "heartbeat" or a "heartbeat packet."

The instructions are preferably provided to a device during a provisioning process, an example of which will be described below, and stored in a memory of the device for execution by the device's CPU. The provisioning methods (and other methods) described in U.S. patent application Ser. No. 10/866,285, which has been incorporated herein by reference, may advantageously be used for implementing some aspects of the present invention. In some implementations, for example, the instructions are provided to the first device as part of a provisioning or reprovisioning process via a DHCP-FORCERENEW command. The command may originate from a server, a host device operated by a network administrator, etc.

In this example, the instructions call for the first device to transmit a first packet at a first time ($T_1$) and to keep transmitting subsequent packets at a predetermined first time interval ($\Delta T_1$) until further instructions are received. The first time interval is preferably tailored to the expected usage of the first device during the time beginning at $T_1$. For example, if the device is expected to be inactive, the first time interval is preferably a relatively longer time interval than if the first device is active or is soon expected to be active.

Preferably, the packet is a customized syslog packet that contains identification information for uniquely identifying the device. The identification information may include, e.g., the EPC code of the device. Moreover the packet preferably contains authentication information and a time stamp. The authentication information may be, for example, a secret that is assigned during the provisioning process. All or part of the packet may be encrypted. In some implementations, only the authentication information is encrypted.

The packet may contain other information, e.g., diagnostic information that may be useful for troubleshooting. Examples of customized syslog packets for implementing the present invention are described below with reference to FIG. 4.

In method 300, a plurality of networked devices is instructed to transmit packets at different times and possibly at different time intervals. Accordingly, a second device is instructed to transmit a packet at $T_2$, another packet at $T_2+\Delta T_2$ (a predetermined second time interval), etc. (Step 305) As with the first device, the second time interval is preferably set according to the expected usage of the second device. This procedure is applied to all N devices in a network: the $N^{th}$ device is instructed to transmit a packet at $T_N$, another packet at $T_N+\Delta T_N$ (a predetermined $N^{th}$ time interval), etc. (Step 310) In some implementations, at least some of the times and/or time intervals are "staggered" in order to minimize the number of packets that are expected to arrive (e.g., at a syslog server) during a particular time interval.

In step 315, it is determined whether heartbeat packets have been received from devices 1 through N (e.g., by a syslog server). In some preferred embodiments, it will be determined whether each heartbeat packet has been received within a predetermined time. Preferably, the packets' receipt will be determined during an ongoing process, rather than at one particular phase of method 300. In some implementations, received packets are archived and in other implementations received packets are discarded. In yet other implementations, certain types of heartbeat packets (e.g., those containing information about device or network status) are stored and other types of heartbeat packets are discarded. Preferably, an event timer will be reset after each packet is received.

In preferred implementations, an authentication process will be applied to at least some packets. In some implementations, the authentication process involves comparing a hashed portion of the heartbeat that includes a secret from a device with what the heartbeat server expected. The secret authorized for the device that sent the heartbeat, e.g., by referencing a database, a lookup table, etc is used by the server to generate a hash value. If the correct secret was included in the heartbeat from the device, it will be assumed that the device indicated by the identification information (e.g., an EPC code) in the heartbeat was the device that transmitted the heartbeat. The authorization process is preferably not applied to all packets. For example, an authorization process may be applied to every M packets, where M is a predetermined number (50, 100, 1,000, 10,000, or any appropriate number). Heartbeats purportedly from devices involving critical operations, valuable items, etc., may be authenticated more often than heartbeats that appear to be from other devices.

If an expected packet is not received within a predetermined time, in some implementations a notification procedure will then ensue (step 320). For example, a communication (e.g., an email, voice mail, text message, etc.) may be sent to a network administrator regarding the non-responsive device (e.g., "No heartbeat from RFID reader 3313 at warehouse 111"). In other implementations, a notification will be sent only after a predetermined number of expected packets have not been received from a non-responsive device. In some implementations, a non-responsive device will be instructed to reboot.

It will be appreciated by those of skill in the art that the steps of method 300 are not necessarily performed in the order indicated. For example, the Nth device may actually be provided with instructions for transmitted a packet before the first device is provided with such instructions. As noted above, the packets' receipt will preferably be determined as part of an ongoing process rather than during only one sequential step of method 300. Moreover, the step of determining whether a change of instructions is warranted (step 325) could occur at various times.

In step 325, it is determined whether a change is required in the packets transmitted by any of devices 1 through N. This determination could be made in response to various factors, including the time of day, calendar (e.g. holiday versus working day), knowledge of an event that will involve a device, indications of a device's recent activity levels, etc. For example, new instructions calling for a change in heartbeat frequency could be issued in response to a determination that a particular device's activity level is about to change.

In one such example, a database accessible to an administrative device (e.g., a server, a host device, etc.) indicates that a delivery is expected at a warehouse door at 6:00 a.m. An RFID device at the warehouse door has been inactive for a number of hours because the warehouse has been closed for the night. Therefore, the RFID device has previously been instructed to transmit heartbeats at a relatively long time interval (e.g., once every hour). Because of known event and the expected change in activity of the RFID device, the administrative device transmits instructions that tell the device to increase the heartbeat frequency to, e.g., 5 minutes.

The new heartbeat instructions may be part of configuration/personality software that is transmitted to the RFID device. For example, the device may be instructed to reboot, assume a personality appropriate for that of an inbound warehouse door, change its antenna reading pattern and increase its heartbeat frequency.

A change may also be indicated by information contained in the heartbeat itself. As noted elsewhere, heartbeats may include various types of information regarding the device that transmitted the heartbeat, the network in which the device is located, or other information. If information in the heartbeat suggests, for example, that the device may be malfunctioning, the device may be instructed to provide heartbeats with other diagnostic information. Exemplary scenarios of this type are discussed below.

However, in some implementations of the invention, the device may be pre-programmed to change its heartbeat frequency and/or to change the information contained in the heartbeat. In some such implementations, the device is pre-programmed to change its heartbeat frequency and/or to change the information contained in the heartbeat at predetermined times. In alternative implementations, the device may be pre-programmed to change its heartbeat frequency and/or to change the information contained in the heartbeat if a predetermined condition occurs. For example, the device may be preprogrammed to transmit device and/or network diagnostic information if the CPU usage of the device exceeds a threshold level.

Figure 4:
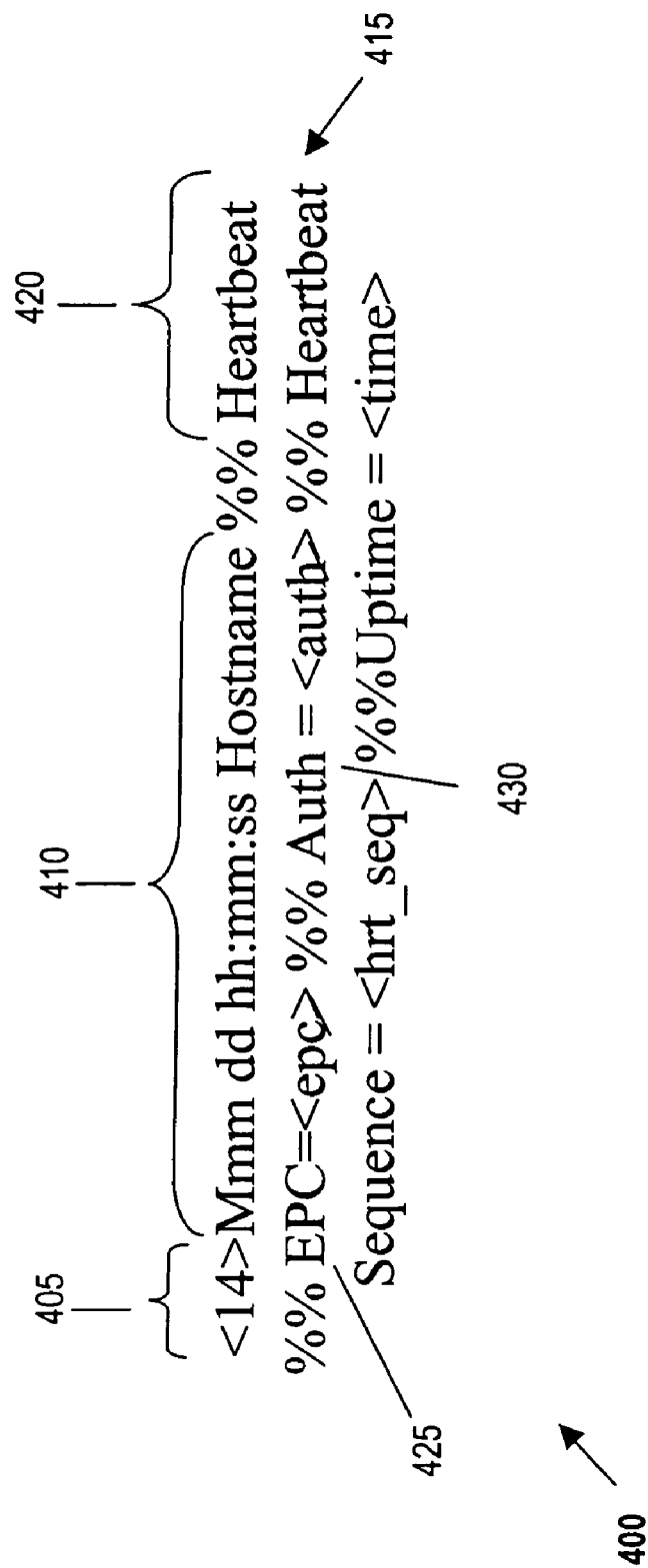
FIG. 4 illustrates one exemplary format of a heartbeat packet of the present invention.

FIG. 4 illustrates one exemplary heartbeat format for implementing some aspects of the invention. It will be appreciated by those of skill in the art that other formats may be used for implementing the present invention. According to RFC 3164, "[t]he payload of any IP packet that has a UDP destination port of 514 MUST be treated as a syslog message." Accordingly, even those implementations of the invention that are based in part on syslog need not be in a particular format. Nonetheless, implementations of the present invention that use syslog are preferably formatted in the manner suggested by RFC 3164.

Therefore, the exemplary heartbeat packet 400 of FIG. 4 includes the priority ("PRI") 405, header 410 and message 415 portions set forth in RFC 3164. However, one or more portions of heartbeat packet 400 (e.g., the message portion) are customized to implement the present invention. PRI portion 405 may be used, for example, to encode one of the 24 Facility codes and/or one of the 8 Severity codes that are set forth in RFC 3164. Header portion 410 includes a time and date stamp, along with an indication of the hostname or IP address of the device.

The remainder of heartbeat packet 400 is message portion 415. Message portion 415 preferably begins with "TAG" portion 420, which indicates the name of the program and/or process that generated the packet (here, "Heartbeat"). The rest of message portion 415 is the "content" portion, which includes identification information 425 and authentication information 430 in this example. Here, identification information 425 is the EPC of the device transmitting the heartbeat. In some embodiments, authentication information 430 is a secret that has previously been provided to the device during a provisioning process, e.g., as described in co-pending U.S. patent application Ser. No. 10/866,285, which has previously been incorporated by reference. The authentication information is preferably encrypted (e.g., hashed) by the device that sent the heartbeat.

One preferred method to hash the data is using an algorithm similar to MD-5. In order to ensure that illicit decryption of the packets are not done, and hence a replay or misinformation attack is done, at least one the keys making up the hash algorithm should be variable. The use of time or a sequence key are common methods. Time is used as syslog packets should contain a timestamp per RFC 3164. However this key is open in the packet and may be used in decryption attacks. A Heartbeat sequence could be used where a random number is chosen and incremented based on a predetermined integer for each heartbeat packet sent. This integer could be per device specific and random, making the sequence value difficult to determine. Further as it is not transmitted, it makes it much more difficult to reverse decrypt.

Some heartbeat packets 400 may serve only to identify the device that transmitted the heartbeat and the time that the heartbeat was transmitted. However, heartbeat packet 400 (or packets having other formats) may contain other types of information. Preferably, this information is set forth according to standardized option fields having predetermined formats. One such exemplary format is CPU_Memory_Disk Utilization. The CPU field may contain, for example, the average percent utilization of the CPU since the time that the last heartbeat was sent and The Memory and Disk Utilization fields could contain information regarding their respective utilizations.

In a second example, heartbeat packet 400 contains LAN interface and/or IP packet statistics, preferably in a predetermined format. For example, such packets could include information regarding "receiver not ready" conditions, dropped packets or frames, megaframes, wrong format of packets or frames, etc.

In a third example, heartbeat packet 400 contains device Uptime information, preferably in a predetermined format. For example, such packets include a "time since last boot" in seconds. Thus an application may determine if the Uptime has lowered from a previous heartbeat packet that the device has been rebooted or it has reset itself.

Alternatively, the heartbeat may contain information specific to a particular vendor or device. Such information could be used for error reporting, product differentiation, or other purposes. If the device is an RFID reader, the heartbeat could include information regarding the performance of the reader, e.g., the current antenna set-up, interference information, incomplete reads, percent of "good" reads, multipath information, etc.

The DHCP protocol is used in some preferred implementations of the present invention because it offers various convenient features. For example, the DHCP protocol allows pools or "scopes" of TCP/IP addresses to be defined. A DHCP server can temporarily allocate or "lease" these TCP/IP addresses to host devices. An IP address that is not used for the duration of the lease is returned to the pool of unallocated IP addresses. In addition, the DHCP server will provide all related configuration settings, such as the default router, Domain Name Service ("DNS") servers, subnet mask, etc., that are required for the proper functioning of TCP/IP.

For implementations using the DHCP protocol, DHCP Options may be used to pass provisioning information, including instructions for the desired type and frequency of heartbeats that a device should transmit. The DHCP protocol is defined in RFC 2131 and DHCP Options are set forth in, for example, RFCs 2132, 3004 and 3046. RFCs 2131, 2132, 3004 and 3046 are hereby incorporated by reference for all purposes.

According to some implementations of the invention, a DHCP server causes an update of a device's heartbeat type or frequency (and/or other device reconfiguration) using a DHCPFORCERENEW command as defined by RFC 3203, which is hereby incorporated by reference in its entirety. In some such implementations, the CPU of the RFID device registers the DHCPFORCERENEW command and starts a new provisioning cycle, for example as described with reference to FIGS. 6 and 7 of U.S. patent application Ser. No. 10/866,285, which has been incorporated by reference in its entirety.

However, in other implementations of the invention, the device may be pre-programmed to change its heartbeat frequency and/or type at predetermined times and/or if one or more predetermined conditions occur. In yet other implementations, a device may be preprogrammed to request new instructions for heartbeat frequency and/or type at a particular time or if certain conditions occur. In some such implementations, the device does so via a DHCPREQUEST, e.g. as described in U.S. patent application Ser. No. 10/866,285.

In order to secure a command, in some implementations a cached secret is hashed within the command. For example, the secret can be included with the EPC code of the RFID device.

One method for creating an authentication key is as follows:

MD-5 (EPC, Challenge, Secret)

By adding in the variable of a random Challenge, no replay attacks of the hash code could be used. Because the EPC is included, the authentication can be further validated to come from a specific device.

Figure 5:
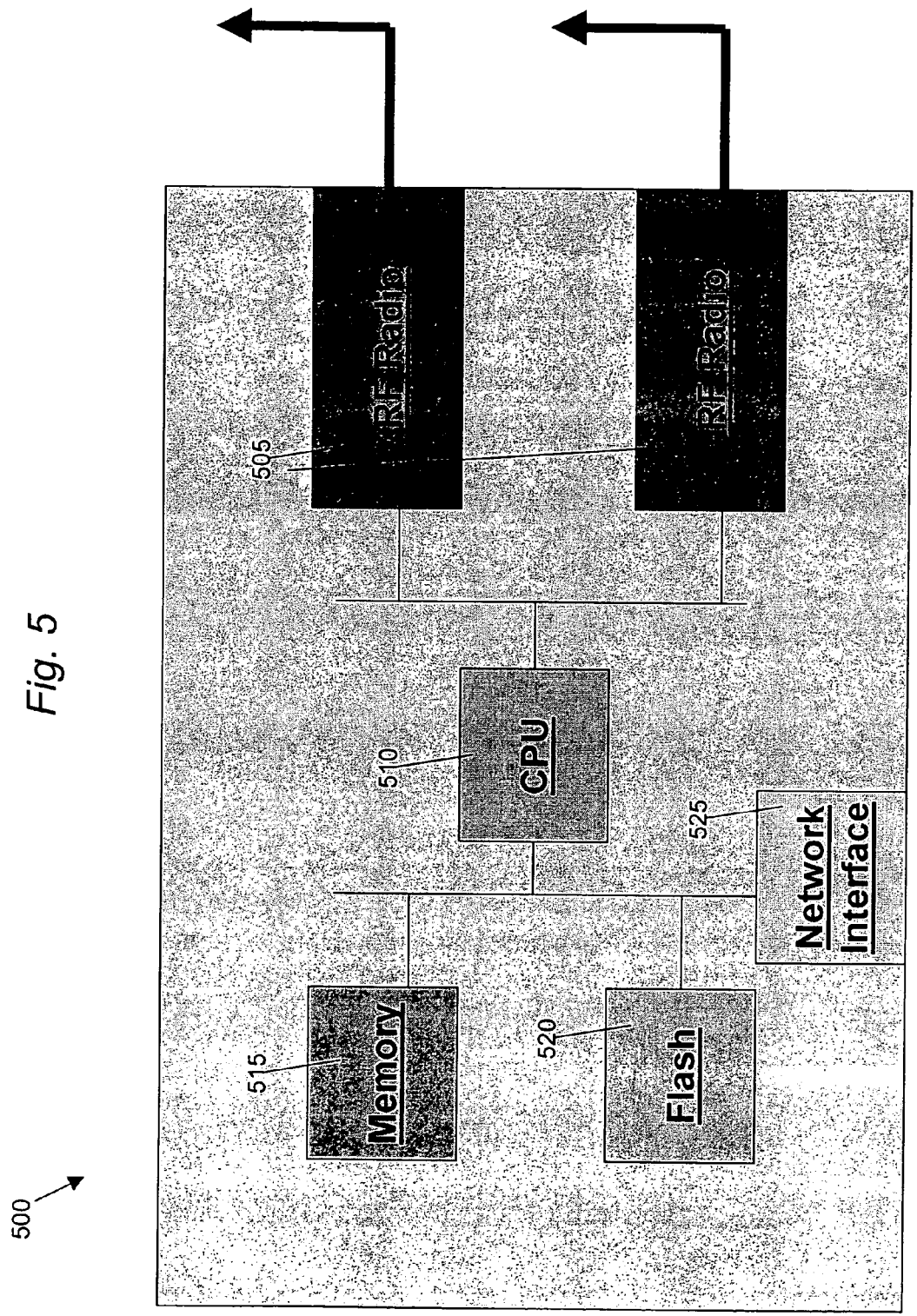
FIG. 5 is a block diagram of an exemplary RFID reader that may be configured to perform some methods of the present invention.

FIG. 5 illustrates an RFID reader that can be configured to perform methods of the present invention. RFID reader 500 includes one or more RF radios 505 for transmitting RF waves to, and receiving modulated RF waves from, RFID tags. RF radios 505 provide raw RF data that is converted by an analog-to-digital converter (not shown) and conveyed to other elements of RFID reader 500. In some embodiments, these data are stored, at least temporarily, by CPU 510 in memory 515 before being transmitted to other parts of RFID network 200 via network interface 525. Network interface 525 may be any convenient type of interface, such as an Ethernet interface.

Flash memory 520 is used to store a program (a "boot-loader") for booting/initializing RFID reader 500. The bootloader, which is usually stored in a separate, partitioned area of flash memory 520, also allows RFID reader 500 to recover from a power loss, etc. In some embodiments of the invention, flash memory 520 includes instructions for controlling CPU 510 to form heartbeats, requests to initiate a provisioning/configuration cycle, etc. In some implementations, flash memory 520 is used to store personality information and other configuration information obtained from, e.g., a DHCP server during such a cycle.

However, in preferred implementations, such information is only stored in volatile memory 515 after being received from, e.g. a DHCP server. There are advantages to keeping RFID devices "dumb." For example, a network of dumb RFID devices allows much of the processing load to be centralized (e.g., performed by server 270 of network 200), instead of being performed by the RFID devices. Alternatively, the processing load can be decentralized, but only to trusted devices (such as PC 247 of network 200).

Configuration information is downloaded from, e.g., a central server to memory 515. Updates may be instigated by the central server or selected, trusted devices. New versions of the image file (e.g., the running, base image necessary to operate the RFID device) are copied into flash memory 520. Alternative embodiments of RFID devices implement the methods of the present invention yet lack flash memory.

Newer RFID devices also include dry contact input/output leads to connect to signal lights, industrial networks or the equivalent. These newer RFID devices typically have evolved in the amount of memory, flash, CPU capacity and methods of determination of the number, type and content of RFID tags in their field of view.

Figure 6:
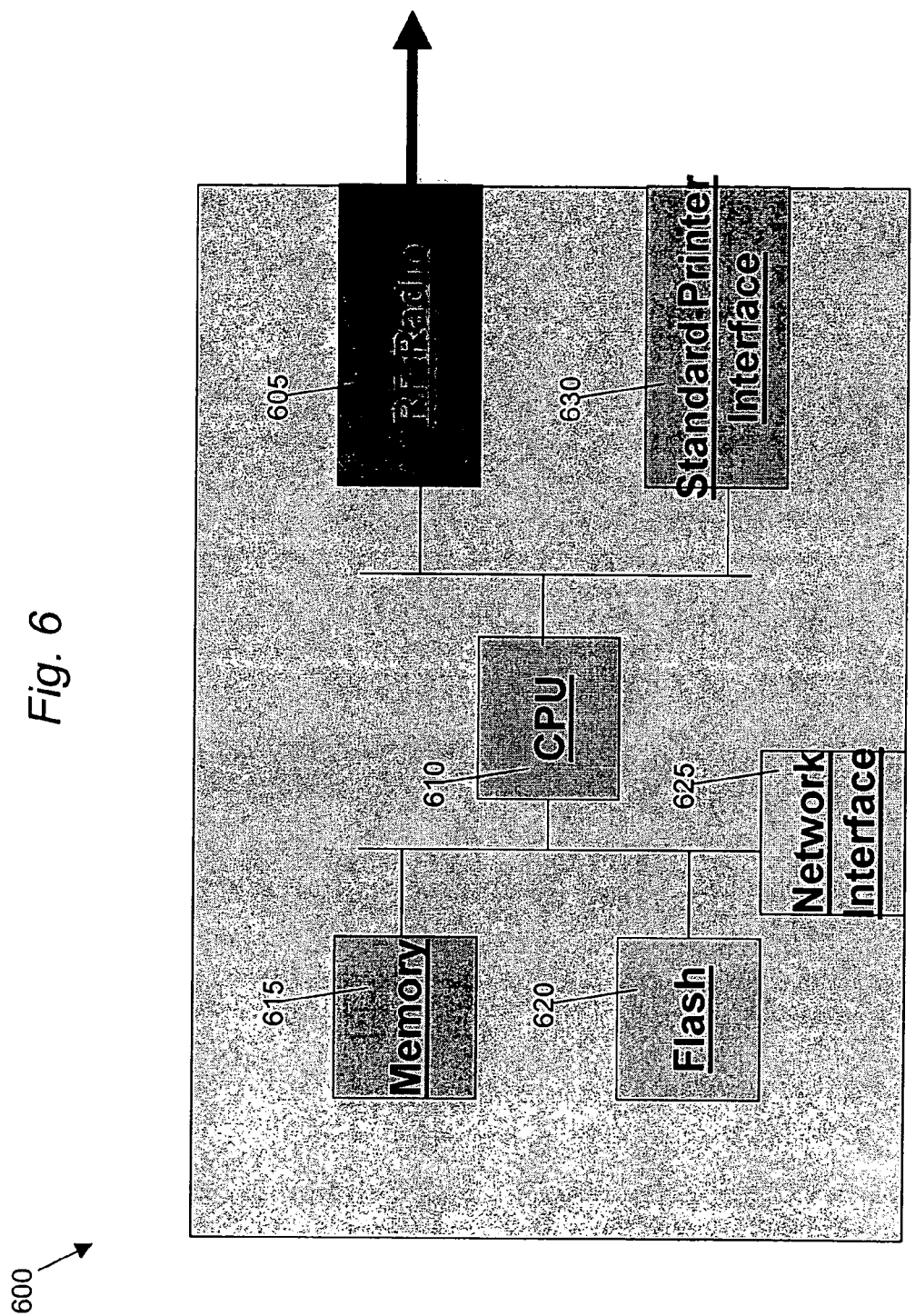
FIG. 6 is a block diagram of an exemplary RFID printer that may be configured to perform some methods of the present invention.

FIG. 6 is a block diagram illustrating an exemplary RFID printer 600 that may be configured to perform some methods of the present invention. RFID printer 600 has many of the same components as RFID reader 500 and can be configured in the same general manner as RFID reader 500.

RFID printer also includes printer interface 630, which may be a standard printer interface. Printer interface prints a label for each RFID tag, e.g. according to instructions received from network 200 via network interface 625.

RF Radio 605 is an outbound radio that is used to send RF signals to the antenna of an RFID tag under the control of CPU 610, thereby encoding information (e.g. an EPC) on the tag's microprocessor. Preferably, RF Radio 605 then checks the encoded information for accuracy. The RFID tag is sandwiched within the label produced by printer interface 630.

Figure 7:
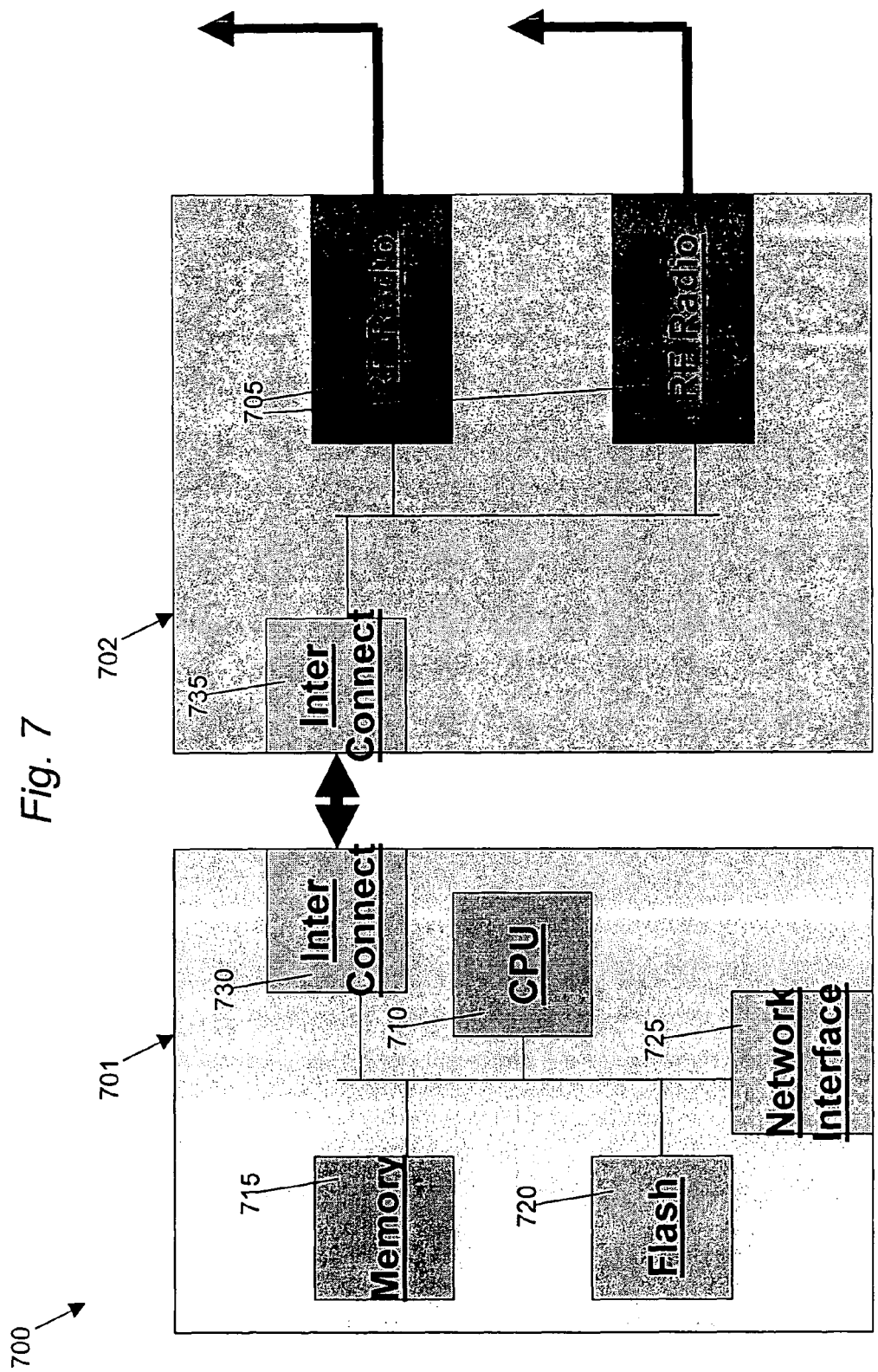
FIG. 7 is a block diagram of an exemplary RFID system that may be configured to perform some methods of the present invention.

FIG. 7 illustrates RFID system 700 that includes control portion 701 and RF radio portion 702. The components of control portion 701 are substantially similar to those described above with reference to FIGS. 5 and 6. Interconnect 730 of control portion 701 is configured for communication with interconnect 735 of RF radio portion 702. The communication may be via any convenient medium and format, such as wireless, serial, point-to-point serial, etc. Although only one RF radio portion 702 is depicted in FIG. 7, each control portion 701 may control a plurality of RF radio portions 702. RFID system 700 may be deployed on a single framework or chassis (e.g., on a forklift) or in multiple chassis.

Figure 8:
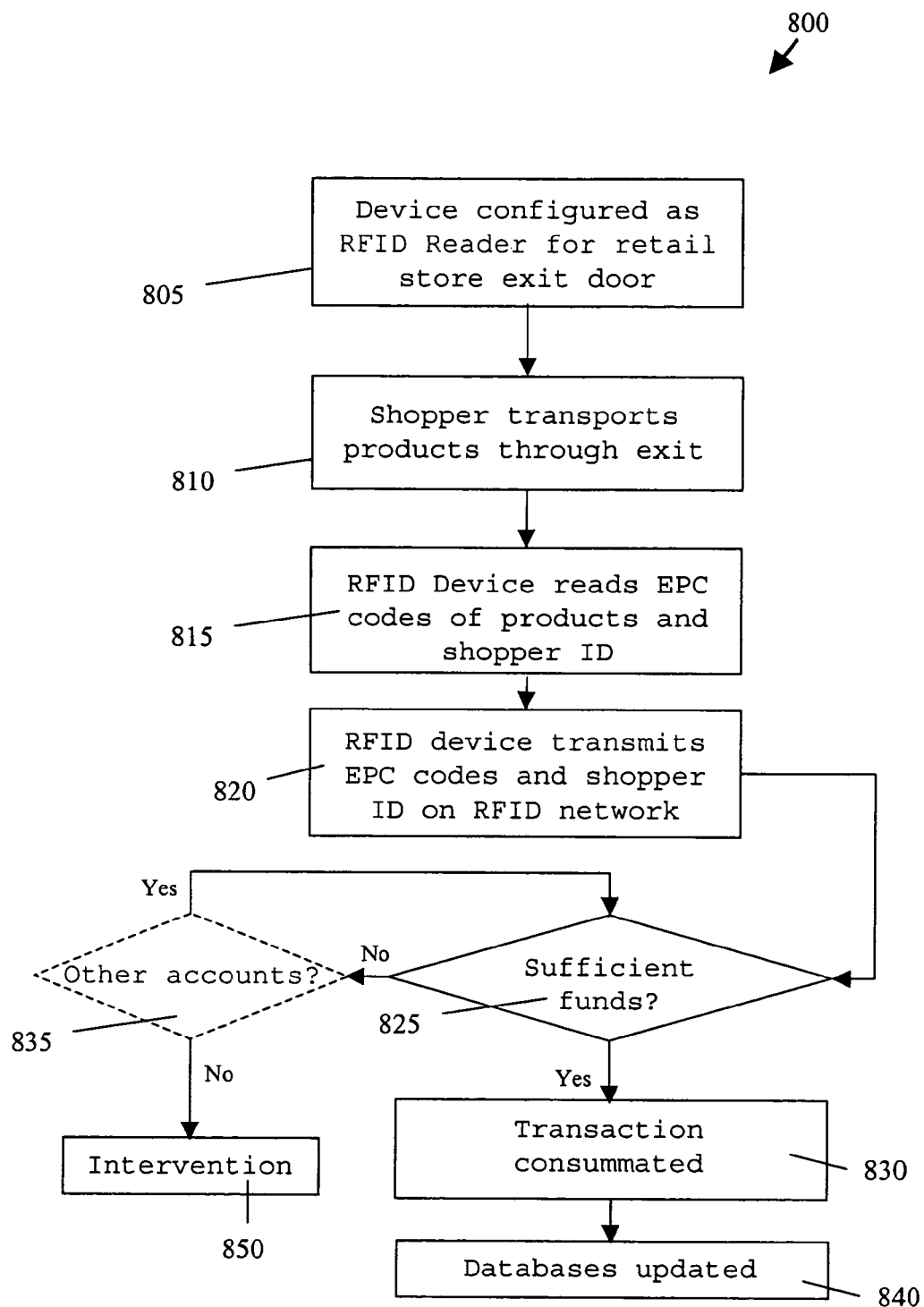
FIG. 8 is a flow chart that provides an overview of some implementations of the present invention.

FIG. 8 is a flow chart that illustrates an exemplary business application of the present invention. Those of skill in the art will appreciate that the example described below with reference to FIG. 8 is but one of many applications of the invention.

In step 805, an RFID device has already been provisioned with heartbeat instructions, etc., according to one or more of the previously-described methods. In this example, the RFID device is an RFID reader that is positioned near an exit door of a retail store. Therefore, in the previous steps, the device has been provisioned with a personality that is appropriate for its role.

Moreover, the device is provisioned with instructions for transmitting one or more types of heartbeats at a frequency that is appropriate for the actual or anticipated use of the device. In this example, the retail store has just opened. Therefore, in the recent past (e.g., 45 minutes ago), the device was instructed to reboot, to increase its heartbeat frequency and to transmit heartbeats with device and local network information. An administrator has determined from these heartbeats that the device is online and is functioning adequately.

In step 810, a shopper exits the door with a number of selected products. In step 815, the RFID reader reads the RFID tags of each product and extracts the EPC codes and related product information (e.g., the price of each product).

The RFID reader also reads an RFID tag that identifies the shopper and the shopper's preferred account(s) that should be debited in order to purchase the products. For example, the shopper may have an RFID tag embedded in a card, a key chain, or any other convenient place in which this information is encoded. The accounts may be various types of accounts maintained by one or more financial institutions. For example, the accounts may be one or more of a checking account, savings account, a line of credit, a credit card account, etc. Biometric data (e.g., voice, fingerprint, retinal scan, etc.) from the shopper may also be obtained and compared with stored biometric data in order to verify the shopper's identity.

In step 820, the RFID reader transmits the product information, including the EPC codes, on the RFID network. In this example, the information is first sent to a financial institution indicated by the shopper's RFID tag.

In step 825, the financial institution that maintains the shopper's selected account determines whether there are sufficient funds (or whether there is sufficient credit) for the shopper to purchase the selected products. If so, the shopper's account is debited and the transaction is consummated (step 830).

In this example, the shopper has the option of designating one or more alternative accounts. Accordingly, if the first account has insufficient funds or credit, it is determined (e.g., by a server on the RFID network) whether there the shopper has indicated any alternative accounts for making purchases (step 835). If so, the next account is evaluated in step 825. If it is determined in step 835 that there are no additional accounts designated by the shopper, in this example some form of human intervention takes place. For example, a cashier of the retail store could assist the shopper in making the purchases in a conventional manner.

If some or all of the products are purchased, information regarding the purchased products (including the EPC codes) is transmitted on the RFID network. For example, this information is preferably forwarded to one or more devices on the RFID network that are configured to update one or more databases maintained by the retail store or the manufacturers/producers, distributors, wholesalers, etc., of the purchased products (step 840). In some implementations, information regarding the shopper is also transmitted on the RFID network (e.g., if the shopper has authorized such information to be released). This product information (and optionally shopper information) may be used for a variety of purposes, e.g., in the formation of various types of business plans (e.g., inventory re-stocking, marketing, sales, distribution and manufacturing/production plans).

Figure 9:
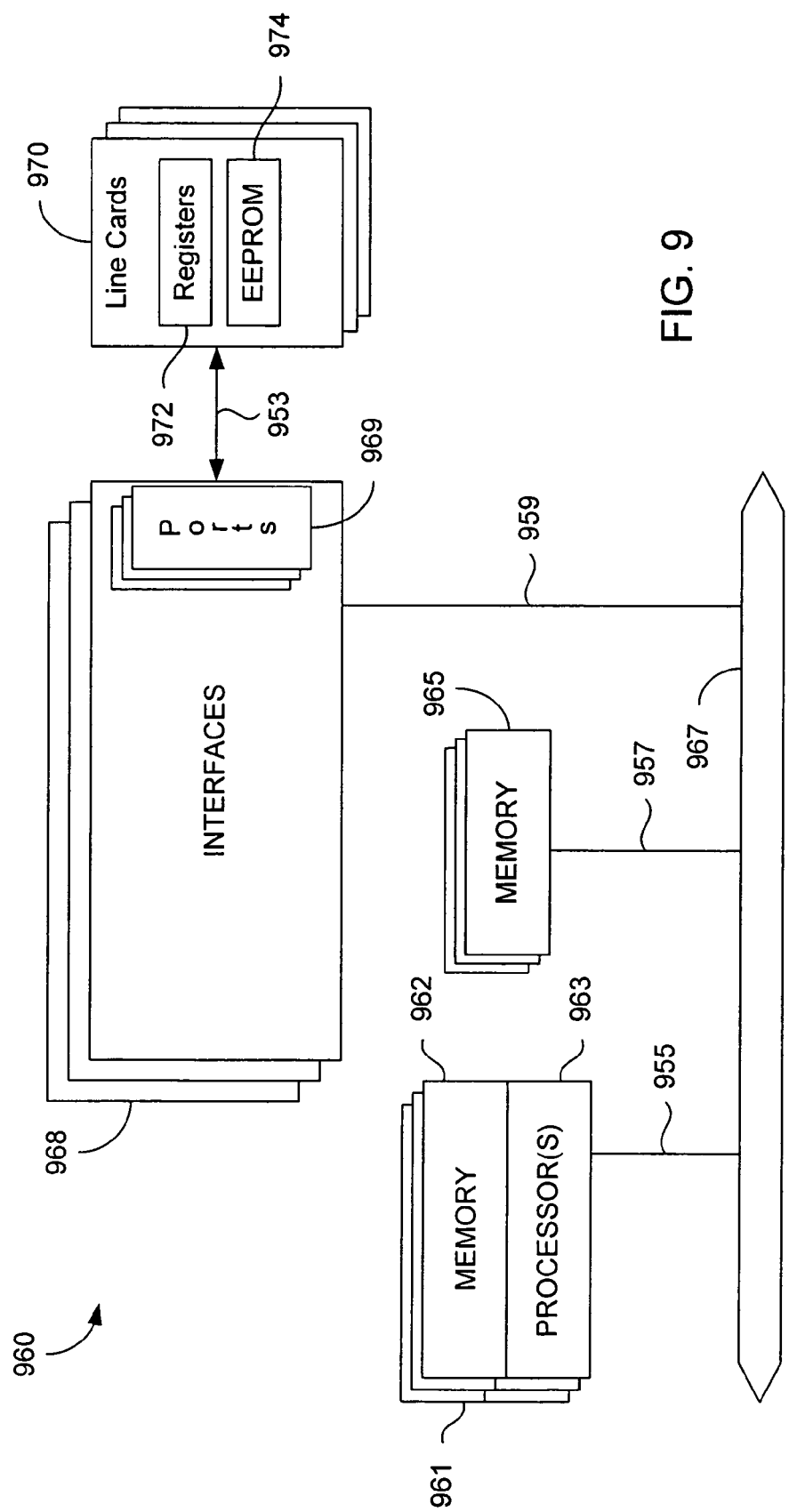
FIG. 9 illustrates an example of a network device that may be configured to implement some methods of the present invention.

FIG. 9 illustrates an example of a network device that may be configured to implement some methods of the present invention. For example, network device 960 may be a syslog server that is configured to implement some aspects of the invention.

Network device 960 includes a master central processing unit (CPU) 962, interfaces 968, and a bus 967 (e.g., a PCI bus). Generally, interfaces 968 include ports 969 appropriate for communication with the appropriate media. In some embodiments, one or more of interfaces 968 includes at least one independent processor 974 and, in some instances, volatile RAM. Independent processors 974 may be, for example ASICs or any other appropriate processors. According to some such embodiments, these independent processors 974 perform at least some of the functions of the logic described herein. In some embodiments, one or more of interfaces 968 control such communications-intensive tasks as media control and management. By providing separate processors for the communications-intensive tasks, interfaces 968 allow the master microprocessor 962 efficiently to perform other functions such as routing computations, network diagnostics, security functions, etc.

The interfaces 968 are typically provided as interface cards (sometimes referred to as "line cards"). Generally, interfaces 968 control the sending and receiving of data packets over the network and sometimes support other peripherals used with the network device 960. Among the interfaces that may be provided are Fibre Channel ("FC") interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 962 may be responsible for implementing specific functions associated with the functions of a desired network device. According to some embodiments, CPU 962 accomplishes all these functions under the control of software including an operating system (e.g. Linux, VxWorks, etc.), and any appropriate applications software.

CPU 962 may include one or more processors 963 such as a processor from the Motorola family of microprocessors or the MIPS family of microprocessors. In an alternative embodiment, processor 963 is specially designed hardware for controlling the operations of network device 960. In a specific embodiment, a memory 961 (such as non-volatile RAM and/or ROM) also forms part of CPU 962. However, there are many different ways in which memory could be coupled to the system. Memory block 961 may be used for a variety of purposes such as, for example, caching and/or storing data, programming instructions, etc.

Regardless of network device's configuration, it may employ one or more memories or memory modules (such as, for example, memory block 965) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 9 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/line cards may be bus based (as shown in FIG. 9) or switch fabric based (such as a cross-bar).

Other Embodiments

Although illustrative embodiments and applications of this invention are shown and described herein, many variations and modifications are possible which remain within the concept, scope, and spirit of the invention, and these variations would become clear to those of ordinary skill in the art after perusal of this application. For example, it will be appreciated by those of skill in the art that this document applies to monitoring the status of any relatively unsophisticated devices in a network, e.g., to monitoring networked sensing devices, devices in an industrial network, etc.

Accordingly, the present embodiments are to be considered as illustrative and not restrictive, and the invention is not to be limited to the details given herein, but may be modified within the scope and equivalents of the appended claims.

We claim:

1. A method, comprising:
   instructing by a network device a first radio frequency identification ("RFID") device to transmit heartbeat packets, wherein instructing by the network device is performed by sending one or more commands including provisioning information to the first RFID device, wherein the provisioning information specifies a frequency of the heartbeat packets that the first RFID device is to transmit, each of the heartbeat packets a first Electronic Product Code ("EPC") of the first RFID device and a time stamp, wherein the EPC of the first RFID device indicates that the first RFID device transmitted the heartbeat packet and the time stamp indicates a time that the heartbeat packet was transmitted by the first RFID device, wherein the one or more commands further indicate a first time at which the first RFID device is to transmit a first one of the heartbeat packets; and
   determining by the network device whether the first RFID device transmitted the first one of the heartbeat packets;
   wherein sending one or more commands comprises sending one or more command packets including the provisioning information to the first RFID device;
   wherein the network device does not transmit the heartbeat packets.

2. The method of claim 1, wherein the first one of the heartbeat packets further comprises encrypted authentication information.

3. The method of claim 2, further comprising validating by the network device the first packet according to the authentication information.

4. The method of claim 1, wherein the first one of the heartbeat packets comprises a syslog packet.

5. The method of claim 1, wherein the first packet comprises information regarding the utilization of the first RFID device.

6. The method of claim 1, wherein the first packet comprises information regarding a local area network that includes the first RFID device.

7. The method of claim 1, wherein the first packet comprises information regarding Internet Protocol packet statistics.

8. The method of claim 1, wherein the first packet comprises information specific to the first RFID device.

9. The method of claim 1, wherein the first packet comprises information specified by a vendor of the first RFID device.

10. The method of claim 1, wherein the first packet comprises information regarding a radio frequency interface of the first RFID device.

11. The method of claim 1, wherein a message portion of the second packet comprises second information, in addition to the second time stamp, that is different from first information in a message portion of the first packet, wherein the second information pertains to the first RFID device.

12. The method of claim 1, further comprising instructing the first RFID device to transmit a second one of the heartbeat packets by providing a second time at which the first RFID device is to transmit the second one of the heartbeat packets, the second one of the heartbeat packets comprising the first EPC and a second time stamp.

13. The method of claim 1, wherein the network device is a Dynamic Host Configuration Protocol (DHCP) server and wherein the one or more command packets conform to the DHCP protocol.

14. The method of claim 13, wherein the one or more command packets include a DHCPFORCERENEW command.

15. The method of claim 13, wherein the one or more command packets include one or more DHCP options that include the provisioning information.

16. The method of claim 1, wherein the first RFID device is a RFID reader.

17. The method of claim 1, wherein the first RFID device is a RFID printer.

18. The method of claim 1, wherein the provisioning information further indicates a type of heartbeat packet that the first RFID device is to transmit, wherein the type of heartbeat packet indicates content of the heartbeat packets to be transmitted by the first RFID device.

19. The method of claim 18, further comprising:
determining whether to modify the content of the heartbeat packets to be transmitted by the first RFID device.

20. The method of claim 1, further comprising:
instructing by the network device a second RFID device to transmit second heartbeat packets, wherein instructing by the network device is performed by sending one or more additional commands including second provisioning information to the second RFID device, wherein the second provisioning information specifies a second frequency of the second heartbeat packets that the second RFID device is to transmit, each of the second heartbeat packets including a second EPC of the second RFID device and a second time stamp, wherein the second EPC of the second RFID device indicates that the second RFID device transmitted the one of the second heartbeat packets and the second time stamp indicates a time that the one of the second heartbeat packets was transmitted by the second RFID device, wherein the one or more additional commands further indicate a second time at which the second RFID device is to transmit a first one of the second heartbeat packets; and
wherein sending one or more additional commands comprises sending one or more additional command packets including the second provisioning information to the second RFID device.

21. The method of claim 1, wherein the network device does not generate the heartbeat packets.

22. An apparatus, comprising:
a processor; and
a memory, at least one of the processor or the memory being configured for:
instructing by the apparatus a first one of a plurality of radio frequency identification (RFID) devices 1 through N to transmit syslog packets by sending one or more command packets to the first one of the RFID devices, the one or more command packets specifying a first time at which the first RFID device is to transmit a first syslog packet and a first frequency at which the first RFID device is to transmit the syslog packets, the first syslog packet comprising a first Electronic Product Code ("EPC") of the first RFID device and a first time stamp; and
instructing by the apparatus each remaining RFID device of the plurality of RFID devices to transmit syslog packets, respectively, by sending additional command packets to remaining ones of the plurality of RFID devices, the additional command packets specifying second through Nth times at which the second through Nth RFID devices are to transmit first syslog packets, the first syslog packets including an EPC of the corresponding remaining RFID device, wherein the additional command packets specify a second frequency at which the second RFID device is to transmit the syslog packets and specify an Nth frequency at which the Nth RFID device is to transmit the syslog packets;
wherein the apparatus does not transmit the syslog packets.

23. The apparatus of claim 22, wherein the apparatus does not generate the syslog packets.

24. A method, comprising:
providing by a network device a first RFID device with first instructions that the first RFID device transmit first syslog packets according to a first time designation, each of the first syslog packets comprising a first Electronic Product Code ("EPC") of the first RFID device and each of the first syslog packets being transmitted according to the first time designation specified in the first instructions, wherein the first time designation includes a first frequency with which the first RFID device is to transmit the first syslog packets;
wherein providing the first RFID device with first instructions comprises transmitting a first set of one or more command packets to the first RFID device, the first set of one or more command packets including the first instructions, wherein the first instructions specify the first time designation including the first frequency with which the first RFID device is to transmit the first syslog packets;
wherein the network device does not transmit the first syslog packets.

25. The method of claim 24, further comprising:
providing by the network device the first RFID device with second instructions to transmit second syslog packets according to a second time designation, each of the second syslog packets comprising a first Electronic Product Code ("EPC") of the first RFID device and each of the second syslog packets being transmitted according to the second time designation specified in the second instructions, wherein the second time designation includes a second frequency with which the first RFID device is to transmit the second syslog packets;
wherein providing the first RFID device with second instructions comprises transmitting a second set of one or more command packets including the second instructions to the first RFID device or providing the second instructions in the first set of one or more command packets, the second set of one or more command packets including the second instructions, wherein the second instructions specify the second time designation including the second frequency with which the first RFID device is to transmit the second syslog packets.

26. The method of claim 24, further comprising:
providing by the network device the first RFID device with second instructions to transmit second syslog packets such that a message portion of each of the second syslog packets includes information not included in the first syslog packets, each of the second syslog packets comprising a first Electronic Product Code ("EPC") of the first RFID device;
wherein providing the first RFID device with second instructions comprises transmitting a second set of one or more command packets including the second instructions to the first RFID device or providing the second instructions in the first set of one or more command packets.

27. The method of claim 24, wherein the network device does not generate the first syslog packets.

28. A computer program embodied in a machine-readable medium, the computer program including instructions that, when executed, causes a processor to perform the following steps:

instructing by a network device a first radio frequency identification ("RFID") device to transmit heartbeat packets, wherein instructing by the network device is performed by sending one or more commands including provisioning information to the first RFID device, wherein the provisioning information specifies a frequency of the heartbeat packets that the first RFID device is to transmit, each of the heartbeat packets including a first Electronic Product Code ("EPC") of the first RFID device and a time stamp, wherein the EPC of the first RFID device indicates that the first RFID device transmitted the heartbeat packet and the time stamp indicates a time that the heartbeat packet was transmitted by the first RFID device, wherein the one or more commands further indicate a first time at which the first RFID device is to transmit a first one of the heartbeat packets, wherein sending one or more commands comprises sending one or more command packets including the provisioning information to the first RFID device;

obtaining information from content of the heartbeat packets that are received from the first RFID device; and determining whether to modify the frequency of heartbeat packets transmitted by the first RFID device;

wherein the network device does not transmit the heartbeat packets.

29. The computer program of claim 28, wherein the first heartbeat packet further comprises encrypted authentication information.

30. The computer program of claim 29, further comprising instructions for validating by the network device the first one of the heartbeat packets according to the authentication information.

31. The computer program of claim 28, wherein the first heartbeat packet comprises a syslog packet.

32. The computer program of claim 28, wherein the first heartbeat packet comprises information regarding the utilization of the first RFID device.

33. The computer program of claim 28, wherein the first heartbeat packet comprises information regarding a local area network that includes the first RFID device.

34. The computer program of claim 28, wherein the first heartbeat packet comprises information regarding Internet Protocol packet statistics.

35. The computer program of claim 28, wherein the first heartbeat packet comprises information specified by a vendor of the first RFID device.

36. The computer program of claim 28, wherein the first heartbeat packet comprises information regarding a radio frequency interface of the first RFID device.

37. The computer program of claim 28, wherein a message portion of a second one of the heartbeat packets comprises second information, in addition to a second time stamp, that is different from first information in a message portion of the first one of the heartbeat packets.

38. The computer-program product of claim 28, further comprising instructions for performing the following steps:

instructing by the network device a second RFID device to transmit second heartbeat packets, wherein instructing by the network device is performed by sending one or more additional commands including second provisioning information to the second RFID device, wherein the second provisioning information specifies a second frequency of the second heartbeat packets that the second RFID device is to transmit, each of the second heartbeat packets including a second EPC of the second RFID device and a second time stamp, wherein the second EPC of the second RFID device indicates that the second RFID device transmitted the one of the second heartbeat packets and the second time stamp indicates a time that the one of the second heartbeat packets was transmitted by the second RFID device, wherein the one or more additional commands further indicate a second time at which the second RFID device is to transmit a first one of the second heartbeat packets; and wherein sending one or more additional commands comprises sending one or more additional command packets including the second provisioning information to the second RFID device.

39. The computer-program product of claim 38, wherein the first time is different from the second time.

40. The computer-program product of claim 38, further comprising instructions for performing the following steps:

obtaining information from content of the second heartbeat packets that are received from the second RFID device; and determining whether to modify the second frequency of the second heartbeat packets transmitted by the second RFID device.

41. The computer-program product of claim 38, wherein the frequency of the heartbeat packets that the first RFID device is to transmit is different from the second frequency of the second heartbeat packets that the second RFID device is to transmit.

42. The computer-program product of claim 38, wherein the provisioning information further indicates a type of heartbeat packet that the first RFID device is to transmit, wherein the type of heartbeat packet indicates content of the heartbeat packets to be transmitted by the first RFID device, and wherein the second provisioning information further indicates a second type of heartbeat packet that the second RFID device is to transmit, wherein the second type of heartbeat packet indicates second content of the second heartbeat packets to be transmitted by the second RFID device;

wherein the content of the heartbeat packets to be transmitted by the first RFID device is different from the second content of the second heartbeat packets to be transmitted by the second RFID device.

43. The computer program of claim 28, wherein the network device does not generate the heartbeat packets.

44. An apparatus, comprising:

a processor; and a memory, at least one of the processor or the memory being configured for:

sending instructions to a first radio frequency identification ("RFID") device, the instructions including provisioning information that specifies a type and frequency of heartbeat packets that the first RFID device is to transmit, wherein the type provided in the provisioning information indicates that the first RFID device is to transmit heartbeat packets that include a first Electronic Product Code ("EPC") of the first RFID device and a first time stamp, wherein the EPC of the first device indicates that the first device transmitted the corresponding heartbeat packet and the first time stamp indicates a time that the corresponding heartbeat packet was transmitted by the first device; and determining whether the first RFID device is transmitting the heartbeat packets;

wherein sending instructions comprises sending a command packet including the provisioning information to the first RFID device;

wherein the apparatus does not transmit the heartbeat packets.

45. The apparatus of claim 44, wherein the provisioning information identifies a first time at which a first one of the heartbeat packets is to be transmitted.

46. The apparatus of claim 44, at least one of the processor or the memory being further adapted for:

determining whether to modify the frequency of heartbeat packets transmitted by the first RFID device.

47. The apparatus of claim 46, wherein determining is performed according to activity level of the first RFID device such that the frequency of heartbeat packets transmitted by the first RFID device is modified according to the activity level of the first RFID device.

48. The apparatus of claim 46, wherein determining is performed based upon factors external to the first RFID device such that the frequency of heartbeat packets transmitted by the first RFID device is modified according to factors external to the RFID device.

* * * * *